United States Patent
Nadir et al.

(10) Patent No.: US 12,340,487 B2
(45) Date of Patent: Jun. 24, 2025

(54) LEARNING BASED DISCRETE COSINE NOISE FILTER

(71) Applicant: Samsung Electronics Co., Ltd., Suwon-si (KR)

(72) Inventors: Zeeshan Nadir, Richardson, TX (US); John W. Glotzbach, Allen, TX (US); Hamid R. Sheikh, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 379 days.

(21) Appl. No.: 17/665,294

(22) Filed: Feb. 4, 2022

(65) Prior Publication Data

US 2023/0252604 A1 Aug. 10, 2023

(51) Int. Cl.
*G06T 5/70* (2024.01)
*G06T 5/10* (2006.01)

(52) U.S. Cl.
CPC ............... *G06T 5/70* (2024.01); *G06T 5/10* (2013.01); *G06T 2207/20056* (2013.01)

(58) Field of Classification Search
CPC . G06T 2207/20056; G06T 2207/20084; G06T 5/10; G06T 5/60; G06T 5/70
See application file for complete search history.

(56) References Cited

U.S. PATENT DOCUMENTS

| | | | |
|---|---|---|---|
| 5,909,249 A * | 6/1999 | Sathe | H04N 19/86 375/240.18 |
| RE41,419 E | 7/2010 | Kim | |
| 8,045,816 B2 | 10/2011 | Lee et al. | |
| 2009/0074300 A1* | 3/2009 | Hull | G06V 30/19147 382/209 |
| 2019/0385288 A1 | 12/2019 | Stewart | |
| 2021/0133986 A1* | 5/2021 | Lee | H04N 25/13 |

FOREIGN PATENT DOCUMENTS

CN 102368821 A 3/2012

* cited by examiner

*Primary Examiner* — Ruiping Li

(57) ABSTRACT

A method includes filtering an input image through a discrete cosine transform based noise filter (DCT-NF). The DCT-NF converts the input image from an original space into a perceptual space, applying gamma correction. The DCT-NF separates luminance channels of the input image from chroma channels of the input image. The DCT-NF divides the input image into overlapping patches and computes DCT transform of the patches. Each patch is a different partial portion of the input image. The DCT-NF suppresses patches that include an input DCT coefficient within a threshold range. The DCT-NF applies an inverse discrete cosine transform (IDCT) to the suppressed patches and remaining overlapping patches that include an input DCT coefficient outside the threshold range. The DCT-NF recombines luminance and chroma channels of the IDCT-transformed patches. The DCT-NF generates a DCT noise-filtered output image by re-converting the IDCT-transformed patches to the original space by applying inverse gamma correction.

20 Claims, 18 Drawing Sheets

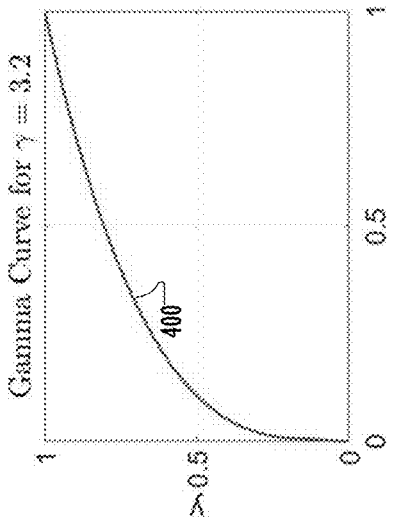
FIG. 3A
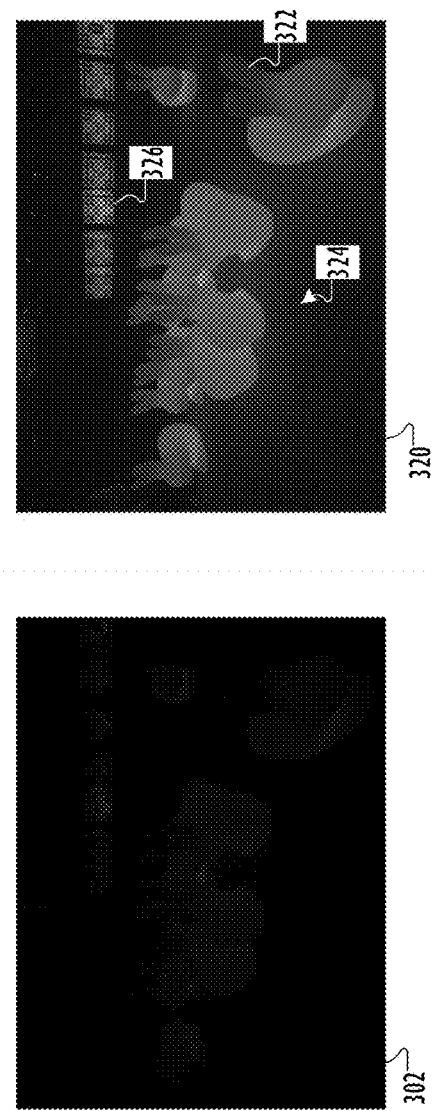
FIG. 3B
FIG. 4
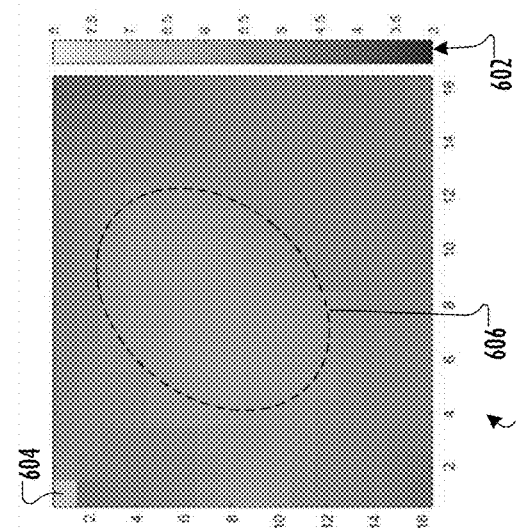
FIG. 5A
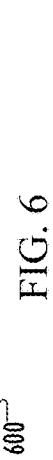
FIG. 5B
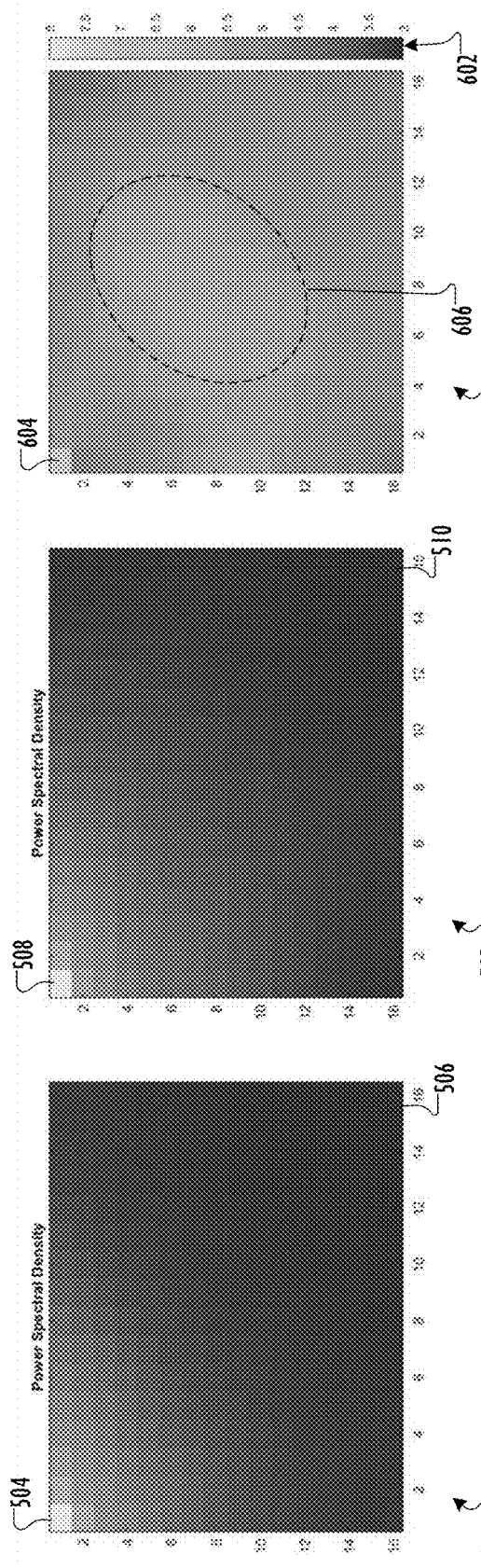
FIG. 6

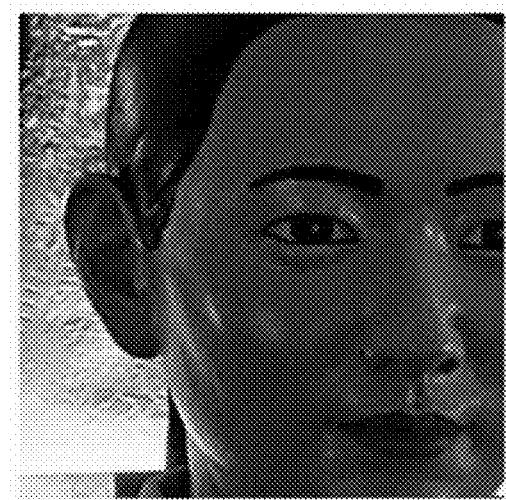
FIG. 7A  702
722y  FIG. 7B
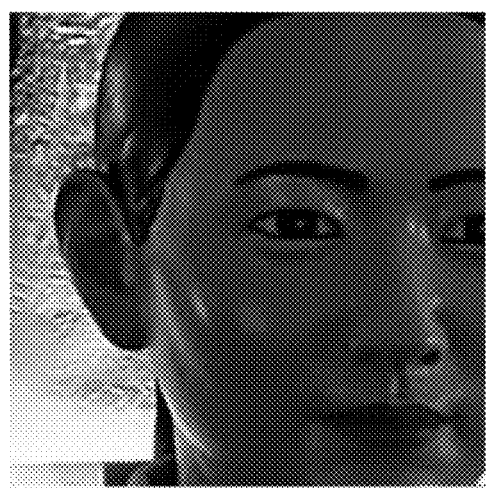
FIG. 7E  740
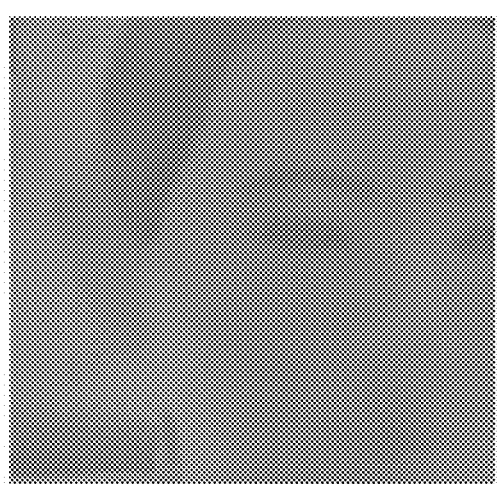
724u  FIG. 7C
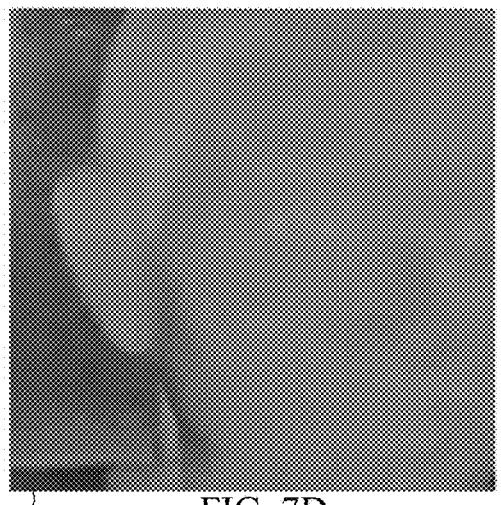
724v  FIG. 7D

LEARNING BASED DISCRETE COSINE NOISE FILTER

TECHNICAL FIELD

This disclosure relates generally to image processing. More specifically, this disclosure relates to a learning based discrete cosine noise filter.

BACKGROUND

With the popularity of mobile devices that include digital cameras, almost everyone can take a picture at any time. As the quality of the camera hardware in mobile devices has improved, users have begun to expect high quality photos from their devices. However, the camera hardware in mobile devices still has significant limitations, such as poor low light performance.

Capturing images in low light conditions is challenging in part because of noisy sensor data. Designing a single noise filter for different light conditions and sensors is challenging due to noise profile changes with both light conditions as well as sensor/optical configuration. Noise filters based on artificial intelligence (AI) are challenging due to their high computational complexity and lack of tenability.

SUMMARY

This disclosure provides a learning based discrete cosine noise filter.

In one embodiment, a method for learning based discrete cosine noise filtering is provided. The method includes receiving an input image from an image capturing device; filtering the received input image by applying a discrete cosine transform based noise filtering (DCT-NF) process; and outputting a DCT noise-filtered output image. Application of the DCT process includes converting the input image from an original space into a perceptual space by applying a gamma correction; separating luminance channels of the input image from chroma channels of the input image; and dividing the input image into overlapping patches. Each patch is a different partial portion of the input image. Applying the DCT algorithm also includes computing a discrete cosine transform (DCT) of the overlapping patches; among the overlapping patches, suppressing patches that include an input DCT coefficient within a threshold range; applying an inverse discrete cosine transform (IDCT) to the suppressed patches and to remaining overlapping patches that include an input DCT coefficient outside of the threshold range; re-combining luminance channels and chroma channels of the IDCT-transformed patches to form a color image; and generating a DCT noise-filtered output image by re-converting the color image to the original space by applying an inverse gamma correction.

In another embodiment, an electronic device for learning based discrete cosine noise filtering is provided. The electronic device includes a processor and a display. The processor is configured to obtain an input image from an image capturing device; filter the received input image by applying a discrete cosine transform based noise filtering (DCT-NF) process; and output a DCT noise-filtered output image. To apply the DCT process, the processor is configured to convert the input image from an original space into a perceptual space by applying a gamma correction; separate luminance channels of the input image from chroma channels of the input image; and divide the input image into overlapping patches. Each patch is a different partial portion of the input image. The processor is further configured to compute a discrete cosine transform (DCT) of the overlapping patches; among the overlapping patches, suppress patches of the DCT block that include an input DCT coefficient within a threshold range; apply an inverse discrete cosine transform (IDCT) to the suppressed patches and to remaining overlapping patches that include an input DCT coefficient outside of the threshold range; re-combine luminance channels and chroma channels of the IDCT-transformed patches to form a color image; and generate a DCT noise-filtered output image by re-converting the color image to the original space by applying an inverse gamma correction.

In yet another embodiment, a non-transitory computer readable medium comprising program code for learning based discrete cosine noise filtering is provided. The program code, when executed by a processor, cause the processor to receive an input image from an image capturing device; filter the received input image by applying a discrete cosine transform based noise filtering (DCT-NF) process; and output a DCT noise-filtered output image. To apply the DCT process, the instructions cause the processor to: convert the input image from an original space into a perceptual space by applying a gamma correction; separate luminance channels of the input image from chroma channels of the input image; divide the input image into overlapping patches. Each patch is a different partial portion of the input image; compute a discrete cosine transform (DCT) of the overlapping patches; among the overlapping patches, suppress patches that include an input DCT coefficient within a threshold range; apply an inverse discrete cosine transform (IDCT) to the suppressed patches and to remaining overlapping patches that include an input DCT coefficient outside of the threshold range; re-combine luminance channels and chroma channels of the IDCT-transformed patches to form a color image; and generate a DCT noise-filtered output image by re-converting the color image to the original space by applying an inverse gamma correction.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a gaming console (such as an XBOX, PLAYSTATION, or NINTENDO), a smart speaker or speaker with an integrated digital assistant (such as SAMSUNG GALAXY HOME, APPLE HOMEPOD, or AMAZON ECHO), an electronic dictionary, an electronic key, a camcorder, or an electronic picture frame.

Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MM) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3A illustrates an example input image without gamma correction in accordance with various embodiments of this disclosure;

FIG. 3B illustrates the input image of FIG. 3A with gamma correction in accordance with various embodiments of this disclosure;

FIG. 4 illustrates an example gamma curve used for gamma correction in accordance with various embodiments of this disclosure;

FIG. 5A illustrates power spectral density of an example patch from the input image of FIG. 3A without gamma correction in accordance with various embodiments of this disclosure;

FIG. 5B illustrates power spectral density of an identically located patch from the image of FIG. 3B with gamma correction in accordance with various embodiments of this disclosure;

FIG. 6 illustrates a ratio of the power spectral density with gamma correction of FIG. 5B in comparison to the power spectral density without gamma correction of FIG. 5A, on a logarithmic scale, in accordance with various embodiments of this disclosure;

FIG. 7A illustrates an example input RGB image in accordance with various embodiments of this disclosure;

FIGS. 7B-7D illustrate examples of respective Y Channel, U Channel, and V Channel output images from an RGB-to-YUV conversion of the RGB image of FIG. 7A in accordance with various embodiments of this disclosure;

FIG. 7E illustrates an example output image from a discrete cosine noise filter that processed the RGB image of FIG. 7A in accordance with various embodiments of this disclosure;

DETAILED DESCRIPTION

FIGS. 1 through 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

Embodiments of this disclosure provide a noise filter that is based on an understanding of images and representing the images according to a Fourier basis. The noise filter can be both fast and adaptive. Certain embodiments provide that the noise filter is configured to learn the optimal way to modify the basic functions of the image such that the noise filter suppresses noise while retaining the details available in the image.

Figure 1:
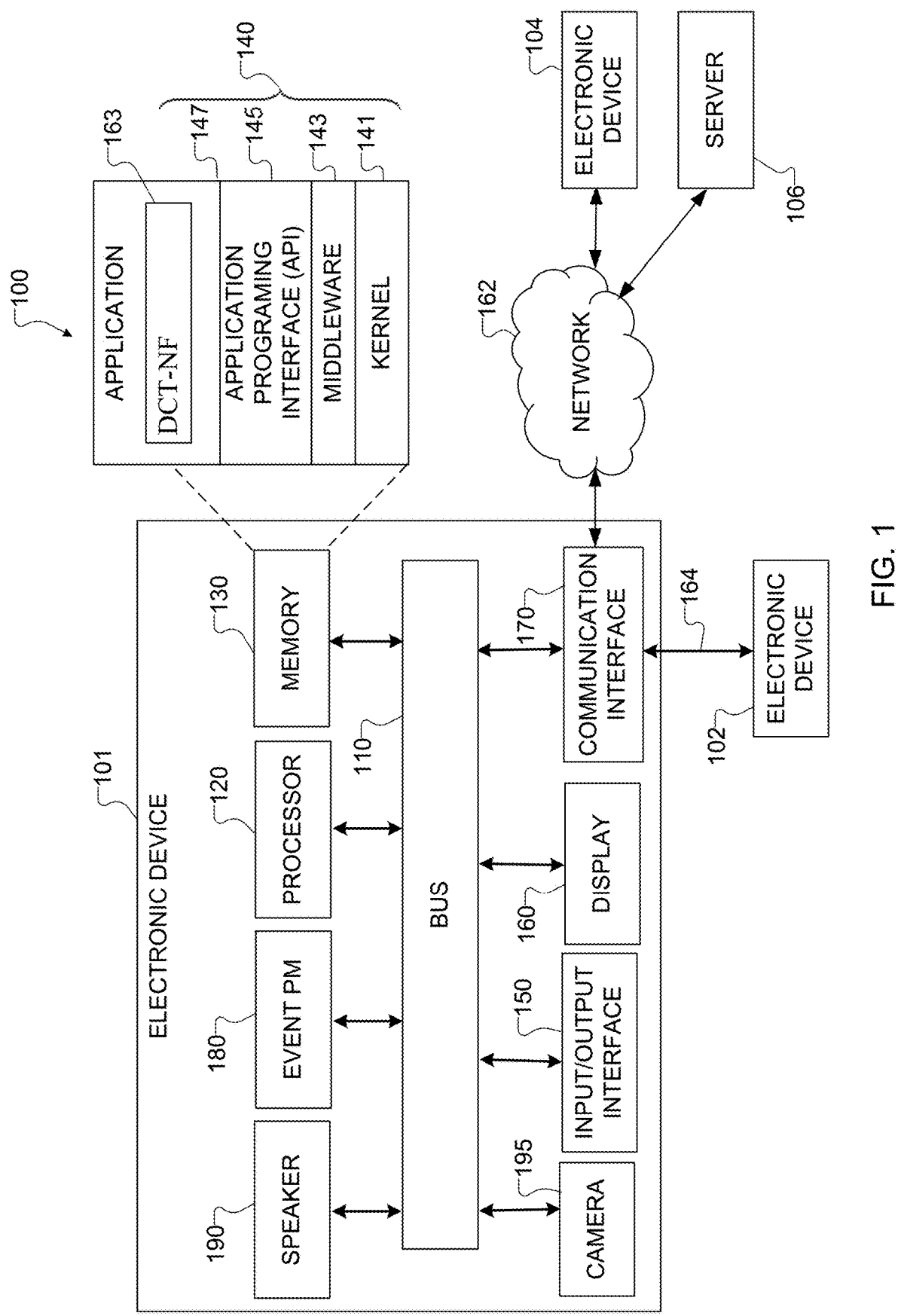
FIG. 1 illustrates an example network configuration including an electronic device in accordance with various embodiments of this disclosure.

FIG. 1 illustrates an example network configuration 100 including an electronic device according to this disclosure. The embodiment of the network configuration 100 shown in FIG. 1 is for illustration only. Other embodiments of the network configuration 100 could be used without departing from the scope of this disclosure.

As shown in FIG. 1, according to embodiments of this disclosure, an electronic device 101 is included in the network configuration 100. The electronic device 101 may include at least one of a bus 110, a processor 120, a memory 130, an input/output (I/O) interface 150, a display 160, a communication interface 170, or an event processing module 180. The electronic device 101 may also include a speaker 190 and camera 195. In some embodiments, the electronic device 101 may exclude at least one of the components or may add another component.

The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication.

The memory 130 may include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS). The applications 147 include a discrete cosine noise filter application 163 ("DCT-NF" 163) that is implemented as a discrete cosine transform based noise filter (DCT-NF), which is described more particularly below. In certain embodiments, applications 147 include a learning based DCT-NF.

The kernel 141 may control or manage system resources (such as the bus 110, processor 120, or memory 130) used to perform operations or functions implemented in other programs (such as the middleware 143, API 145, or application program 147). The kernel 141 may provide an interface that allows the middleware 143, API 145, or application 147 to access the individual components of the electronic device 101 to control or manage the system resources. The middleware 143 may function as a relay to allow the API 145 or the application 147 to communicate data with the kernel 141, for example. A plurality of applications 147 may be provided. The middleware 143 may control work requests received from the applications 147, such as by allocating the priority of using the system resources of the electronic device 101 (such as the bus 110, processor 120, or memory 130) to at least one of the plurality of applications 147. The API 145 is an interface allowing the application 147 to control functions provided from the kernel 141 or the middleware 143. For example, the API 133 may include at least one interface or function (such as a command) for file control, window control, image processing, or text control.

The I/O interface 150 serves as an interface that may, for example, transfer commands or data input from a user or other external devices to other component(s) of the electronic device 101. Further, the I/O interface 150 may output commands or data received from other component(s) of the electronic device 101 to the user or the other external devices.

The display 160 may include, for example, a liquid crystal display (LCD), a light emitting diode (LED) display, an organic light emitting diode (OLED) display, a microelectromechanical systems (MEMS) display, or an electronic paper display. The display 160 can also be a depth-aware display, such as a multi-focal display. The display 160 may display various contents (such as text, images, videos, icons, or symbols) to the user. The display 160 may include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The first external electronic device 102 or the second external electronic device 104 may be a wearable device or an electronic device 101-mountable wearable device (such as a head mounted display (HMD)). When the electronic device 101 is mounted in an HMD (such as the electronic device 102), the electronic device 101 may detect the mounting in the HMD and operate in a virtual reality mode. When the electronic device 101 is mounted in the electronic device 102 (such as the HMD), the electronic device 101 may communicate with the electronic device 102 through the communication interface 170. The electronic device 101 may be directly connected with the electronic device 102 to communicate with the electronic device 102 without involving with a separate network.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The first and second external electronic devices 102 and 104 each may be a device of the same type or a different type from the electronic device 101. According to embodiments of this disclosure, the server 106 may include a group of one or more servers. Also, according to embodiments of this disclosure, all or some of the operations executed on the electronic device 101 may be executed on another or multiple other electronic devices (such as the electronic devices 102 and 104 or server 106). Further, according to embodiments of this disclosure, when the electronic device 101 should perform some function or service automatically or at a request, the electronic device 101, instead of executing the function or service on its own or additionally, may request another device (such as electronic devices 102 and 104 or server 106) to perform at least some functions associated therewith. The other electronic device (such as electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

The camera 195 enables the capture of photographs including frames at different sensor/optical configurations. For example, the camera 195 could include the hardware, such as one or more lenses, a photodetector element, and other components used to convert light into a digital image. The camera 195 may additionally include specialized processors for performing various functions related to capturing photographs, or the camera 195 may use the processor 120 for these purposes.

The DCT-NF 163 filters out and removes noise from an input image captured by the camera 165 to generate a DCT noise-filtered output image. The DCT-NF app 163 suppresses noise while retaining details from the input image, and operates rapidly and adaptively. By comparison, a conventional noise filter, such as a Gaussian filter, removes both noise and a lot of the details from an input image, which makes the Gaussian filter less than optimal. Applying enhancements or post-processing to images that contain abundant noise produces poor quality images. The DCT-NF app 163 removes noise from images, and then the application of enhancements or post-processing to a DCT noise-filtered output image produces higher quality images. The DCT-NF app 163 has a lower computational complexity than an artificial intelligence (AI) based noise filter (AI-based NF), and the DCT-NF app 163 is tunable while an AI-based NF lacks tunability.

While FIG. 1 shows that the electronic device 101 includes the communication interface 170 to communicate with the external electronic device 102 or 104 or server 106 via the network(s) 162 and 164, the electronic device 101 may be independently operated without a separate communication function, according to embodiments of this disclosure. Also, note that the electronic device 102 or 104 or the server 106 could be implemented using a bus, a processor, a memory, a I/O interface, a display, a communication interface, and an event processing module (or any suitable subset thereof) in the same or similar manner as shown for the electronic device 101.

The server 106 may operate to drive the electronic device 101 by performing at least one of the operations (or functions) implemented on the electronic device 101. For example, the server 106 may include an event processing server module (not shown) that may support the event processing module 180 implemented in the electronic device 101. The event processing server module may include at least one of the components of the event processing module 180 and perform (or instead perform) at least one of the operations (or functions) conducted by the event processing module 180. The event processing module 180 may process at least part of the information obtained from other elements (such as the processor 120, memory 130, input/output interface 150, or communication interface 170) and may provide the same to the user in various manners.

In some embodiments, the processor 120 or event processing module 180 is configured to communicate with the server 106 to download or stream multimedia content, such as images, video, or sound. For example, a user operating the electronic device 101 can open an application or website to stream multimedia content. The processor 120 (or event processing module 180) can process and present information, via the display 160, to enable a user to search for content, select content, and view content. In response to the selections by the user, the server 106 can provide the content or record the search, selection, and viewing of the content, or both provide and record.

While the event processing module 180 is shown to be a module separate from the processor 120 in FIG. 1, at least a portion of the event processing module 180 may be included or implemented in the processor 120 or at least one other module, or the overall function of the event processing module 180 may be included or implemented in the processor 120 shown or another processor. The event processing module 180 may perform operations according to embodiments of this disclosure in interoperation with at least one program 140 stored in the memory 130.

Although FIG. 1 illustrates one example of a network configuration 100, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
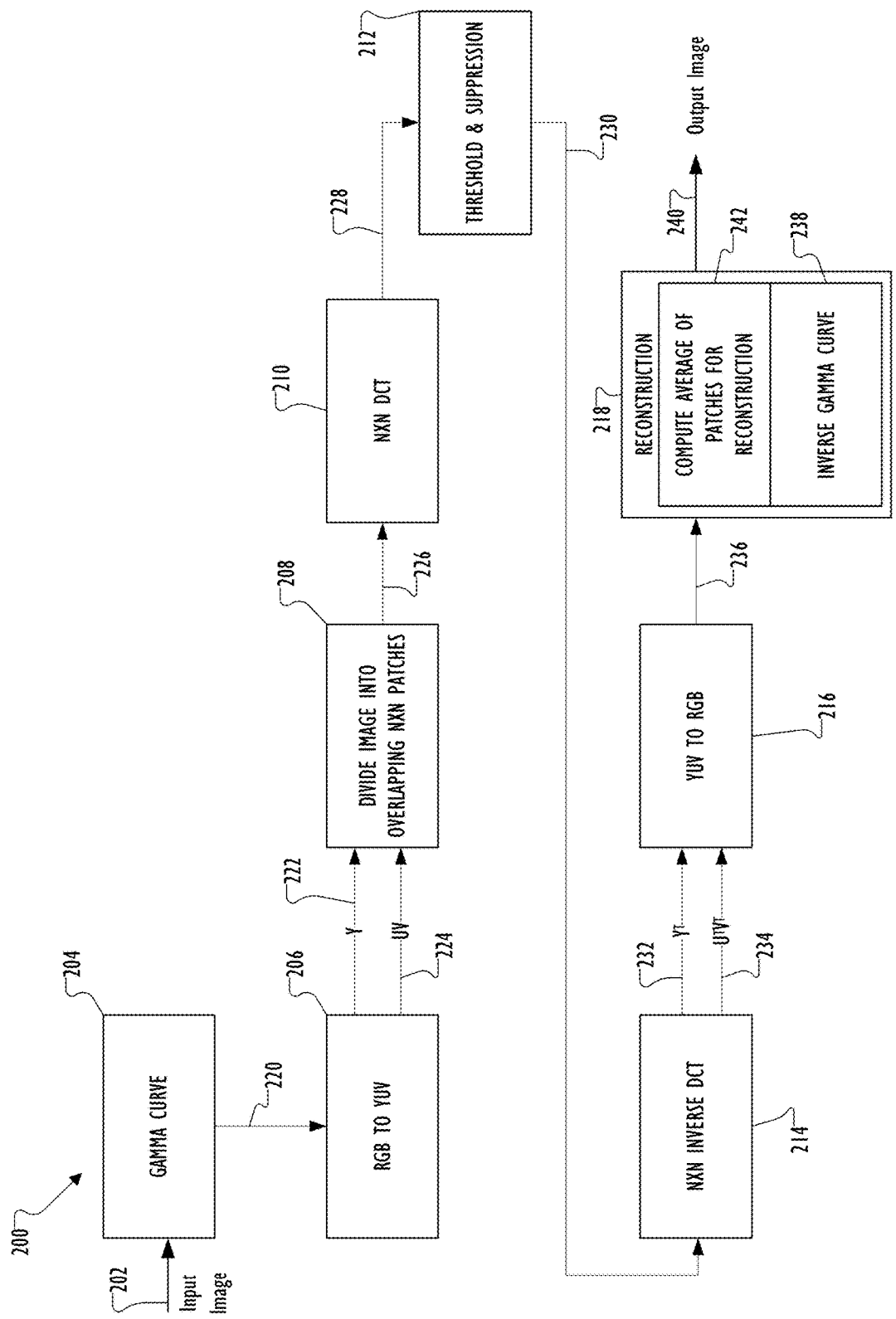
FIG. 2 illustrates a flow diagram of operations of a first example discrete cosine noise filter in accordance with various embodiments of this disclosure.

FIG. 2 illustrates a flow diagram of operations of a first example discrete cosine noise filter ("DCT-NF") 200 in accordance with an embodiment of this disclosure. The embodiment of the DCT-NF 200 shown in FIG. 2 is for illustration only. Other embodiments could be used without departing from the scope of this disclosure. In certain embodiments, the DCT-NF 200 is the same as, or implemented by, DCT-NF app 163 of FIG. 1.

The DCT-NF 200 filters out noise from an input image 202 received from an image capturing device, such as the camera 195, by applying a DCT-NF algorithm to the received input image 202. The DCT-NF 200 includes a gamma curve module 204, a first conversion module 206, a deconstruction module 208, an N×N discrete cosine transform (DCT) 210, a thresholding and suppression module 212, an N×N inverse discrete cosine transformer (IDCT) 214, a second conversion module 216, and a reconstruction module 218. One or more of the blocks or modules can be implemented in hardware, software, firmware, or a combination of hardware and software/firmware. For example, one or more of the blocks can be implemented in processing circuitry configured to perform the specified functions or configured to execute instructions in an algorithm to perform the specified functions.

The gamma curve module 204 converts the input image 202 from an original space into a perceptual space by applying a gamma correction, and outputs a gamma-corrected image 220. The function of the gamma curve module 204 is described in further detail with respect to FIGS. 3-6.

The first conversion module 206 receives an input and separates luminance channels from chroma channels of the input. For example, the first conversion module 206 can convert an image from the red-green-blue (RGB) domain to the YUV domain. In the RGB domain, the R channel, G channel, and B channel each include both luminance components and chrominance components for each pixel. Alternatively, in the YUV domain, the Y channel represents the luminance component, while the U and V channels represent the chrominance components of each pixel. The luminance component is also referred to as the luma or brightness, and a chrominance component is also referred to as a color component. The first conversion module 206 outputs the luminance channel 222 (Y-channel) separately from outputting the chrominance channel 224 (UV-channel). In some embodiments, the first conversion module 206 separates luminance channels of the gamma-corrected image 220 from chroma channels of the gamma-corrected image 220. In some embodiments, the input to the first conversion module 206 is the input image 202, instead of the gamma-corrected image 220, in which case the luminance channels and chroma channels of the input image 202 are separated.

The deconstruction module 208 receives an input image and deconstructs (for example, partitions, separates, or divides) the input into overlapping patches, wherein each patch is a different partial portion of the input Each patch can include an N×N=16×16 block of pixels, and then outputs a deconstructed image 226. In some embodiments, the deconstruction module 208 may receive and divide the gamma-corrected image 220, the input image 202, or the image composed from the luminance channel 222. The function of the deconstruction module 208 is described in further detail with respect to FIGS. 8 and 9A-9D. In the example shown in FIG. 2, the DCT-NF 200 is described as processing the deconstructed image 226 as a single image; however, the deconstruction 208 can output multiple deconstructed images. The deconstructed image 226 may represent a first deconstructed image among the multiple deconstructed images outputted by the deconstruction module 208. In certain embodiments, the DCT-NF 200 processes each of the multiple deconstructed images in the same or similar manner as the deconstructed image 226.

The DCT 210 generates a DCT block 228 by applying a discrete cosine transform to the deconstructed image 226. The function of the DCT 210 is described in further detail with respect to FIGS. 10A-10D. The DCT-NF 200 will be described as processing the DCT block 228 as a single patch. In certain embodiments, the DCT 210 processes each of the patches within the deconstructed image 226 in the same or similar manner as the DCT block 228.

The thresholding and suppression module 212 suppresses noise that is present within patches of the DCT block 228. More particularly, the thresholding and suppression module 212 suppresses patches of the DCT block 228 that include an input DCT coefficient outside of a threshold range, and then outputs a DCT block 230 containing the thresholded and suppressed patches. For clarity, the DCT block 230 is also referred to as the "suppressed DCT block" 230. The function of the thresholding and suppression module 212 is described in further detail with respect to FIGS. 11A-11E.

At this point, that noise has been filtered out or removed from the suppressed DCT block 230, and the DCT-NF 200 proceeds to generate DCT noise-filtered output image by: (i) using the IDCT 214 to revert the process performed by the DCT 210; and (ii) using the second conversion module 216 to revert the process performed by the first conversion module 206.

The inverse discrete cosine transformer 214 applies an inverse discrete cosine transform to the suppressed DCT block 230. The IDCT 214 outputs the luminance channel 232 ($Y^T$ channel) separately from outputting the chrominance channel 234 ($U^T V^T$ channel).

The second conversion module 216 combines or re-combines luminance channels with chroma channels. For example, the second conversion module 216 converts an image from the YUV domain to the RGB domain. The second conversion module 266 outputs a re-combined image 236 including an R channel, G channel, and B channel.

The reconstruction module 218 includes an inverse gamma correction module 238 generates a DCT noise-filtered output image 240 by re-converting the color image 236 from the perceptual space to the original space by applying an inverse gamma correction.

In some embodiments, DCT-NF 200 includes an averaging module 242 that computes an average of the reconstructed patches. For example, the reconstruction module 218 may include the averaging module 242 that computes an average of patches for reconstruction, such as patches within the color image 236.

Although FIG. 2 illustrates a first example DCT-NF 200, various changes may be made to FIG. 2. For example, various components in FIG. 2 could be combined, further subdivided, or omitted and additional components could be added according to particular needs.

FIGS. 3A-6 show examples of operations within the gamma curve module 204. FIG. 3A illustrates an example input image 302 without gamma correction in accordance with an embodiment of this disclosure. The input image 302 can be captured by the camera 195 in a low light environment and inputted to a DCT-NF as the input image 202. The input image 302 is very dark and appears to be totally black.

FIG. 3B illustrates the input image of FIG. 3A with gamma correction in accordance with various embodiments of this disclosure. That is, the gamma-corrected image 320 shown in FIG. 3B may be generated by an output from the gamma curve module 204, which converts the input image 302 from an original space into a perceptual space by applying a gamma correction. The gamma correction reveals that the scene captured by the camera 195 includes sculptures of rabbits 322 with internal white illumination, a highly textured ground 324 that is faintly illuminated by the rabbits, and a row of lanterns 326 that emit warm white light.

FIG. 4 illustrates an example gamma curve 400 used for gamma correction in accordance with an embodiment of this disclosure. The gamma curve 400 can be used by the gamma curve module 204 and by the inverse gamma correction module 238 to perform gamma correction and inverse gamma correction, respectively. As an example, a gamma curve 400 corresponds to a gamma value of 3.2 ($\gamma$=3.2) used to generate the gamma-corrected image 320. The gamma curve module 204 scales the pixel values of the input image according to the gamma curve 400. The x-axis shows the input pixel value, scaled 0-1. The y-axis shows output pixel values, scaled 0-1. Human visual system is more sensitive to changes in the luminance of an image in darker areas as compared to brighter areas of the image, hence the gamma curve is used to mimic the human visual system.

FIG. 5A illustrates a power spectral density (PSD) map 500 of an example patch from the input image 302 of FIG. 3A without gamma correction in accordance with various embodiments of this disclosure. FIG. 5B illustrates a power spectral density map 502 of an identically located patch from the image 320 of FIG. 3B with gamma correction in accordance with various embodiments of this disclosure. FIG. 6 illustrates a map 600 of a ratio of the power spectral density map 502 with gamma correction of FIG. 5B in comparison to the power spectral density map 500 without gamma correction of FIG. 5A, on a logarithmic scale, in accordance with various embodiments of this disclosure. FIG. 6 also shows a scale 602 of the ratio in the form of a color bar. The map 600 of the ratio in FIG. 6 reveals that after performing gamma correction, the PSD in FIG. 5B has increased especially in the middle region of the 16×16 PSD when compared with the PSD in FIG. 5A. The PSD measures of the power content of a signal versus frequency. The horizontal and vertical axes are numbered 1 to 16, representing that a patch is a 16×16 grid of pixels, and that the input image 302 is divided into a grid of 16×16 patches.

Referring to FIG. 5A, an upper-left portion the PSD map 500, such as the second quadrant, has more power than the remaining first, third, and fourth quadrants of the PSD map 500 at the upper-right, lower-left, and lower right portions. The (1,1) block 504 in the first column and first row of the PSD map 500 has a bright yellow color that corresponds to the highest PSD value, as compared to the other non-yellow blocks. In comparison, the (16,16) block of 506 has the dark purple color that corresponds to the lowest PSD value (such as 3) of the PSD scale 602.

Referring to FIG. 5B, each value on this map 502 corresponds to the power content in a specific frequency component. For example, the (1,1) block 508 corresponds to the DC power of the image (or the average value of patches). The (16,16) block 510 of the PSD map 502 shows the power content of the highest frequency component. When a ratio is taken between the corresponding values in the maps 502 and 500 of FIG. 5B and FIG. 5A, as illustrated by the map 600 of the ratio in FIG. 6, the ratio shows the PSD 502 of FIG. 5B is amplified as shown by the color bar scale 602 of FIG. 6 (in log scale). The map 600 of the ratio in FIG. 6 shows that the amplification is the strongest for the DC component 604 and is strong in the middle frequency regions 606.

FIG. 7A illustrates an example input RGB image 702 in accordance with various embodiments of this disclosure. The RGB image shows a yellow-gold metallic background and the face of a mannequin. The input image 702 can be captured by the camera 195 in a low light environment and inputted to a DCT-NF as the input image 202.

FIGS. 7B, 7C, and 7D illustrate examples of respective Y channel, U channel, and V channel output images 722y, 724u, and 724v from an RGB-to-YUV conversion of the RGB image 702 of FIG. 7A in accordance with various embodiments of this disclosure. In FIG. 7B, the Y channel image 722y represents the luminance channel 222 output from the first conversion module 206. The Y channel image 722y shows that a majority of the details of from the input image 702 are in present in the Y-channel. In FIGS. 7C and 7D, the U channel and V channel images 724u and 724v represent the chrominance channel 224 output from the first conversion module 206. The U channel and V channel images 724u and 724v show few details from the input image 702.

FIG. 7E illustrates an example output image 740 from a discrete cosine noise filter that processed the RGB image of FIG. 7A in accordance with various embodiments of this disclosure. A DCT-NF in accordance with various embodiments of this disclosure can generate and output the DCT noise-filtered output image 740 based on filtering the input image 702. The DCT noise-filtered output image 740 shows that graininess of the face of the mannequin has been removed and appears smooth.

Figure 8:
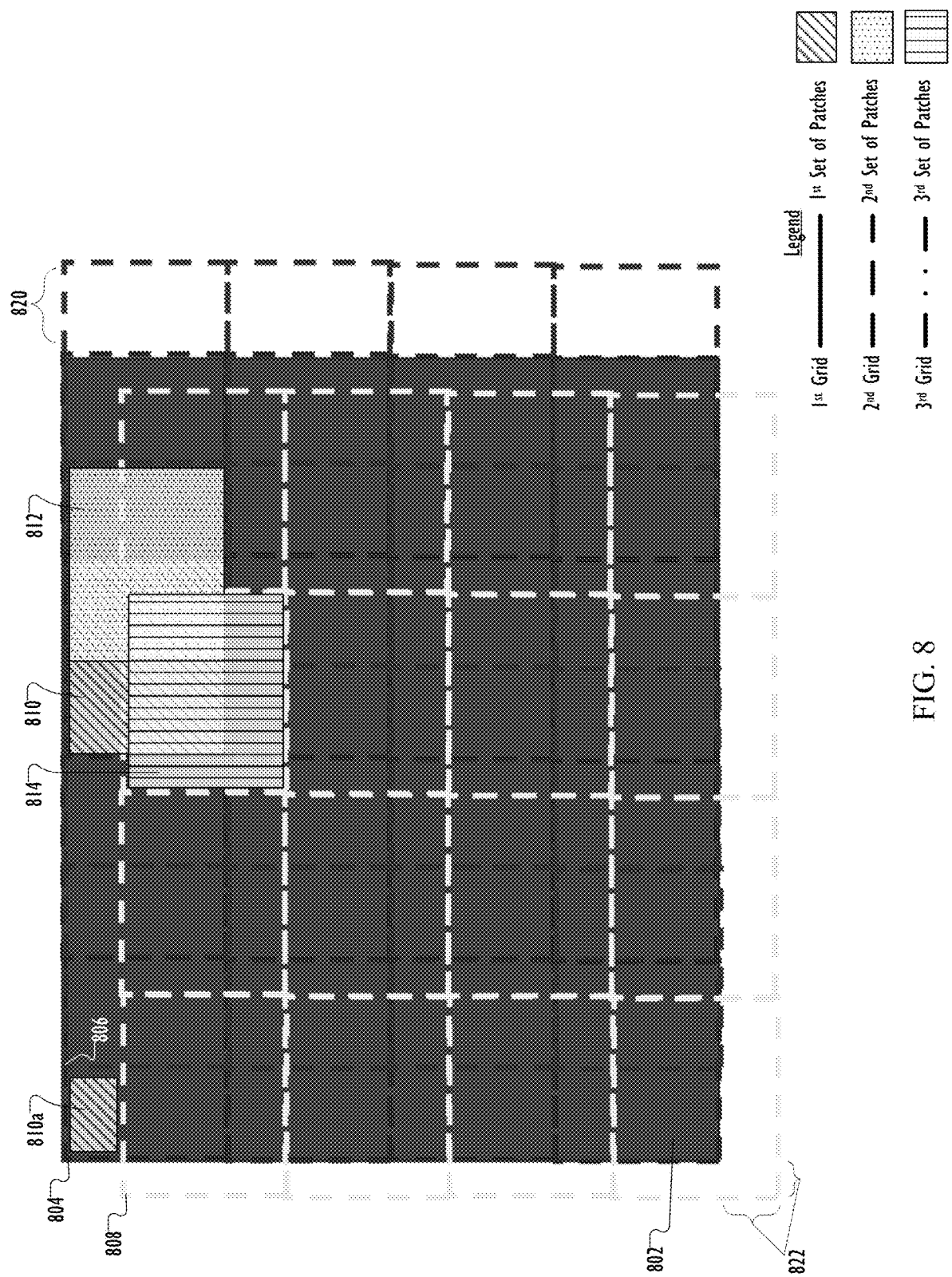
FIG. 8 illustrates an example operation of dividing an image into overlapping patches in accordance with various embodiments of this disclosure.

FIG. 8 illustrates an example operation of dividing an image into overlapping patches in accordance with various embodiments of this disclosure. The image 802 (shown as a shaded box) represents an input to the deconstruction module 208. The deconstruction module 208 selects a patch size, and then determines a grid size based on the selected patch size and the size of the image 802. In some embodiments, deconstruction module 208 determines the grid size by dividing the image size by the patch size. For example, if the image 802 has a width (W) and height (H) of W×H=1024× 1024 pixels, and if the deconstruction module 208 selects a patch size that is an N×N=16×16 block of pixels, then as a result, the deconstruction module 208 determines the grid size of 64×64 patches based on M×M=W/N×H/N. The deconstruction module 208 overlays a first grid 804 and a second grid 806 over the image 802. Additional grids can be added, such as the third grid 808. In certain embodiments, each of the grids 804-808 can be an array of patches constructed from a selected patch size of 16×16 pixels. Although the example shown in FIG. 8 depicts a 4×4 array, the grids 804-808 are not limited to being a 4×4 array, and that the deconstruction module 208 can use differently sized grids, such as an 8×8 grid, or any suitable M×M grid. The deconstruction module 208 can use the first grid 804 to divide the image 802 into patches of having the selected patch size. For example, the image 802 can be divided into four rows and four columns, thereby forming a 4×4 array of first patches 810. In certain embodiments, deconstruction module 208 uses the second and third grids 806 and 808, which may be identical to the first grid 804, to divide the image 802 into identically shaped second patches 812 and third patches 814, respectively. The deconstruction module 208 plots the top-left corner of each of the grids 804-808 at a different location on the image 802, such that the first patches 810 partially overlap the second patches 812 one way (such as offset horizontally only) and overlap the third patches 814 another way. As such, the first grid 804 covers the entire image 802, but a portion 810a of the image 802 is included within only a first patch 810. An empty portion 820 of the second grid 806 does not cover the image 802, and a different empty portion 822 of the third grid 808 does not cover the image 802. Although some of the patches 810, 812, 814 include part of the empty portions 820-822, electronic device 101 may process the entire patch. For ease of explanation, the entirety of a set of patches, such as the set of first patches 810, can be referred to as a 4×4 block of patches. The entirety of an individual patch, such as the first patch 810, can be referred to as a 16×16 block of pixels.

The 4×4 block of first patches 810 can be output from the deconstruction module 208 as a first deconstructed image, such as 226 of FIG. 6. The deconstruction module 208 can generate a different deconstructed image per grid. A second deconstructed image is generated based on the second grid 806 and includes the 4×4 block or set of second patches 812. In certain embodiments, the block of third patches 812 defines a third deconstructed image generated based on the third grid 808.

Figure 9A:
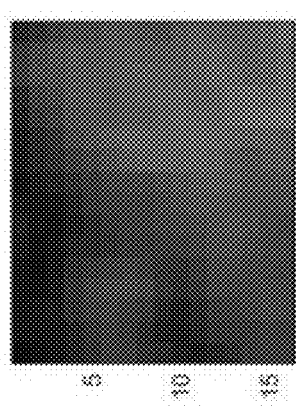
FIGS. 9A-9D illustrate 4 example patches of a deconstructed image in accordance with various embodiments of this disclosure.
Figure 9B:
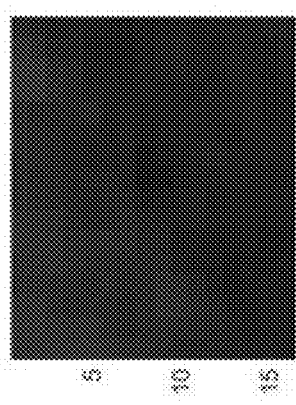
Figure 9C:
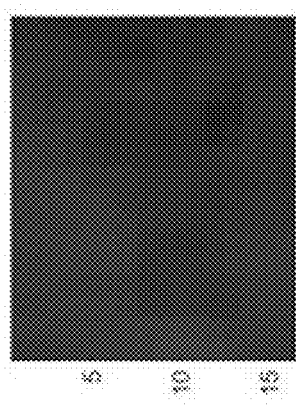
Figure 9D:
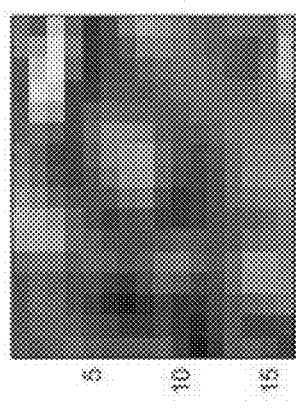

FIGS. 9A-9D illustrate four example patches 926a-926d of a deconstructed input image in accordance with various embodiments of this disclosure. For example, the four patches 926a-926d could be randomly selected from the 4×4 block of first patches 810. Alternatively, the four patches 926a-926d could represent a selected row of the 4×4 block of first patches 810. Each of input patches 926a-926d includes a block of pixels arranged in an N×N array. For example, as shown in FIG. 9A, the DCT 210 can separately receive 16×16 input pixels as a first patch 926a from the deconstruction module 208. The first through fourth patches 926a-926d, together with the remaining patches derived from the same grid may be the same as, or similar to, the deconstructed image 226 of FIG. 2. As described further below, FIGS. 9A, 10A, 11A, and 12A describe operations for processing the first patch 926a through the discrete cosine transformer 210 and thresholding and suppression module 212. FIGS. 9B-12B, 9C-12C, and 9D-12 describe operations for processing operations for processing a second, third, and fourth block 926b, 926c, and 926d through the discrete cosine transformer 210 and thresholding and suppression module 212, respectively.

Figure 10A:
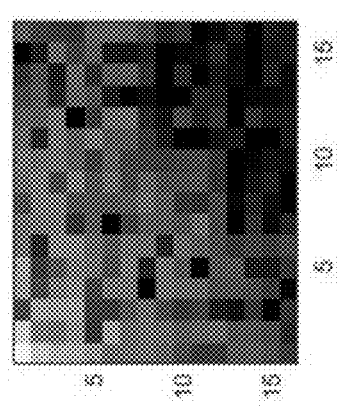
FIGS. 10A-10D illustrate four discrete cosine transformed (DCT) patches in which pixels are arranged in an N×N array in accordance with various embodiments of this disclosure.
Figure 10B:
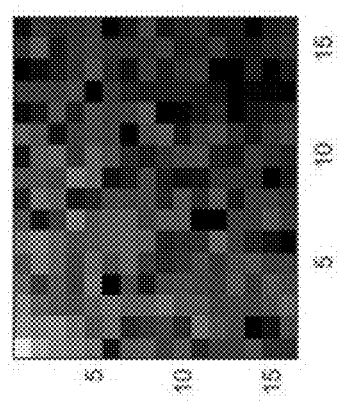
Figure 10C:
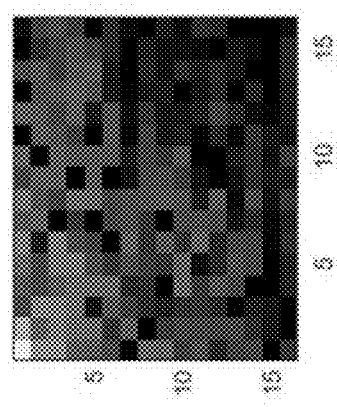
Figure 10D:
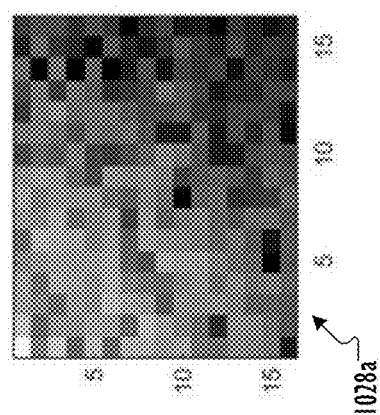

FIGS. 10A-10D illustrate four DCT patches in which pixels are arranged in an N×N array in accordance with an embodiment of this disclosure. For example, as shown in FIG. 10A, the DCT 210 can generate a first DCT block 1028a (also referred to as "DCT-transformed patch" 1028a) by applying a discrete cosine transformation to the first patch 926a.

Figure 11A:
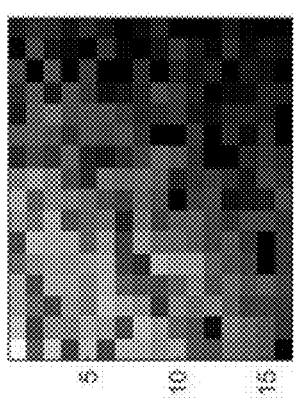
FIGS. 11A-11D illustrate four thresholded DCT-transformed patches in accordance with various embodiments of this disclosure.
Figure 11B:
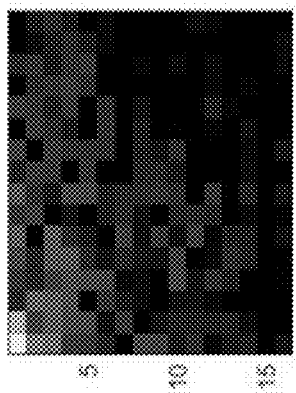
Figure 11C:
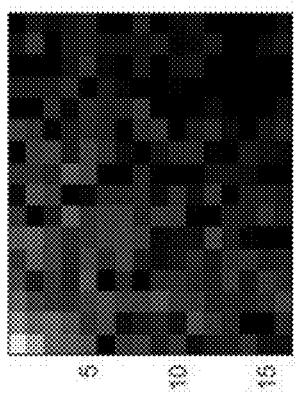
Figure 11D:
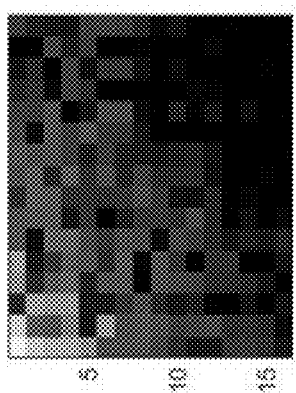
Figure 12A:
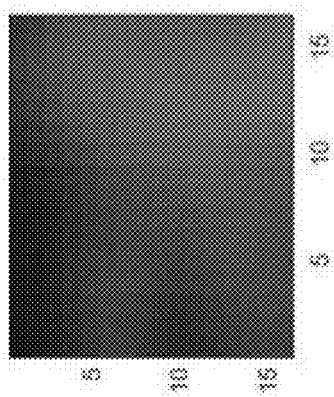
FIGS. 12A-12D illustrate four output patches in accordance with various embodiments of this disclosure.
Figure 12B:
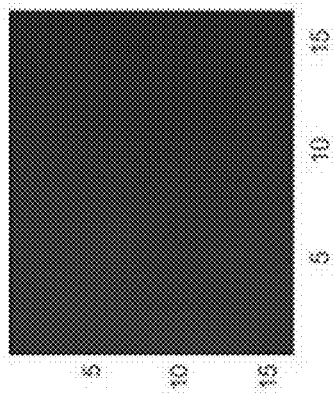
Figure 12C:
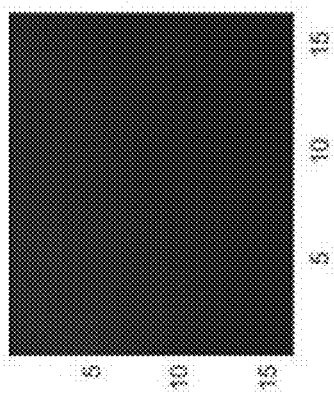
Figure 12D:
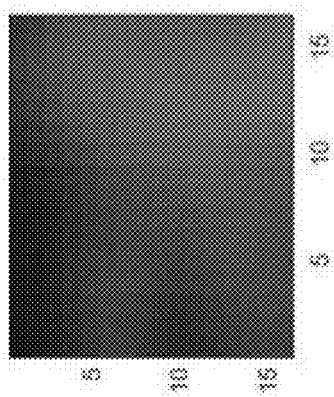

FIGS. 11A-11D illustrate four thresholded DCT-transformed patches in accordance with various embodiments of this disclosure. For example, as shown in FIG. 11A, the thresholding and suppression module 212 generates a thresholded DCT block 1140a by thresholding each of the pixels of the first DCT block 1028a using threshold parameters of FIG. 11E to perform thresholding functions.

As compared to the example input patches 926a-926d depicted in FIGS. 9A-9D, FIGS. 12A-12D illustrate four output patches arranged in an array in accordance with an embodiment of this disclosure. For example, thresholding and suppression module 212 generates the suppressed DCT block 1240a of 16×16 pixels using threshold parameters and suppression parameters of FIG. 11E to perform thresholding and suppression functions. Thresholding together with suppression causes the suppressed DCT block 1240a to contain patches that smoothly transition luminance with neighboring patches.

Figure 11E:
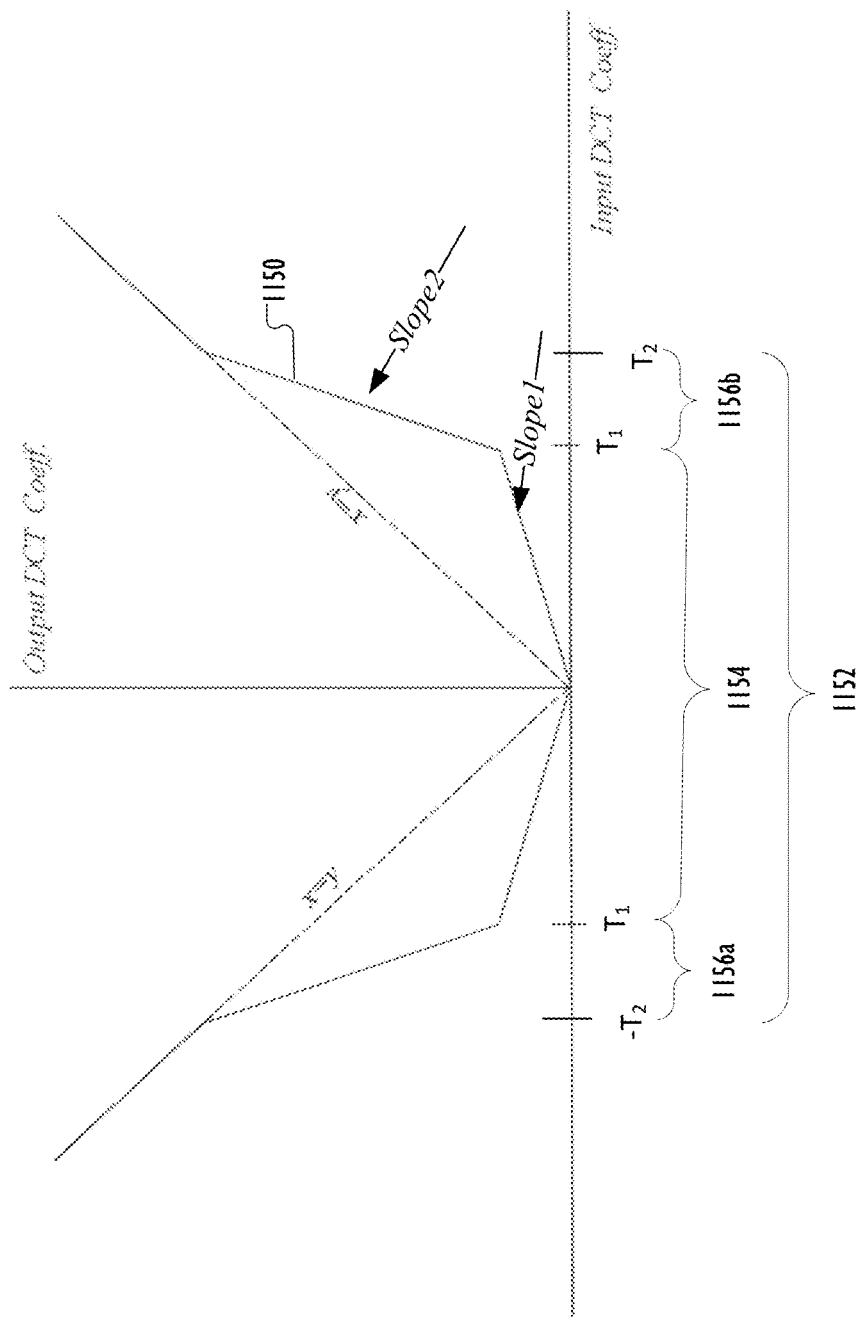
FIG. 11E illustrates an example suppression threshold curve in accordance with various embodiments of this disclosure.

FIG. 11E illustrates an example suppression threshold curve 1150 in accordance with an embodiment of this disclosure. As shown, the horizontal axis represents input DCT coefficient values, and the vertical axis represents output DCT coefficient values. The suppression threshold curve 1150 is defined by threshold and suppression parameters including a threshold range 1152, and a first slope (slope1), and a second slope (slope2). The threshold and suppression parameters can be predetermined by a designer. In certain embodiments, the threshold parameters and suppression parameters are tuned by defining the threshold range 1152 based on a power spectral density obtained from a live image capture.

The threshold range 1152 includes input DCT coefficient values from zero to plus or minus (±) a second threshold value $T_2$. That is, the threshold range 1152 includes input DCT coefficient values greater than $-T_2$ and less than less than $+T_2$. As described above, when the input DCT coefficient value of the respective patch is greater than $-T_2$ and less than $+T_2$, the thresholding and suppression module 212 suppresses the output DCT coefficient of the patch according to the first slope or second slope. Input DCT coefficient values that are less than or equal to $-T_2$ or greater than or equal to $+T_2$ are outside of the threshold range 1152.

A first suppression range 1154 includes input DCT coefficient values from zero to plus or minus (±) a first threshold value $T_1$. When the input DCT coefficient value of the respective patch is greater than $-T_1$ and less than $+T_1$, the thresholding and suppression module 212 suppresses the output DCT coefficient based on slope1, for example by suppressing the output DCT coefficient to a value that is based on a product of multiplying the input DCT coefficient by slope 1. Pixels having an input DCT coefficient value within the first suppression range 1154 are more likely to exhibit noise than a pixel having a DCT coefficient value outside of the first suppression range 1154.

Similarly, a second suppression range 1156a-1156b (1156) includes input DCT coefficient values between $T_1$ and $T_2$—meaning greater than $-T_2$ and less than $-T_1$ or greater than $+T_1$ and less than $+T_2$. When the input DCT coefficient value of the respective patch is within the second suppression range 1156, the thresholding and suppression module 212 suppresses the output DCT coefficient based on slope2, for example by suppressing the output DCT coefficient to a value that is based on a product of multiplying the input DCT coefficient by slope2. In certain embodiments, slope2 is greater than slope1. The second suppression range 1156 provides a visually smoother transition from pixels that are aggressively suppressed by the first suppression range 1154 to non-suppressed pixels that are outside the whole threshold range 1152 and thus do not undergo suppression.

Figure 13:
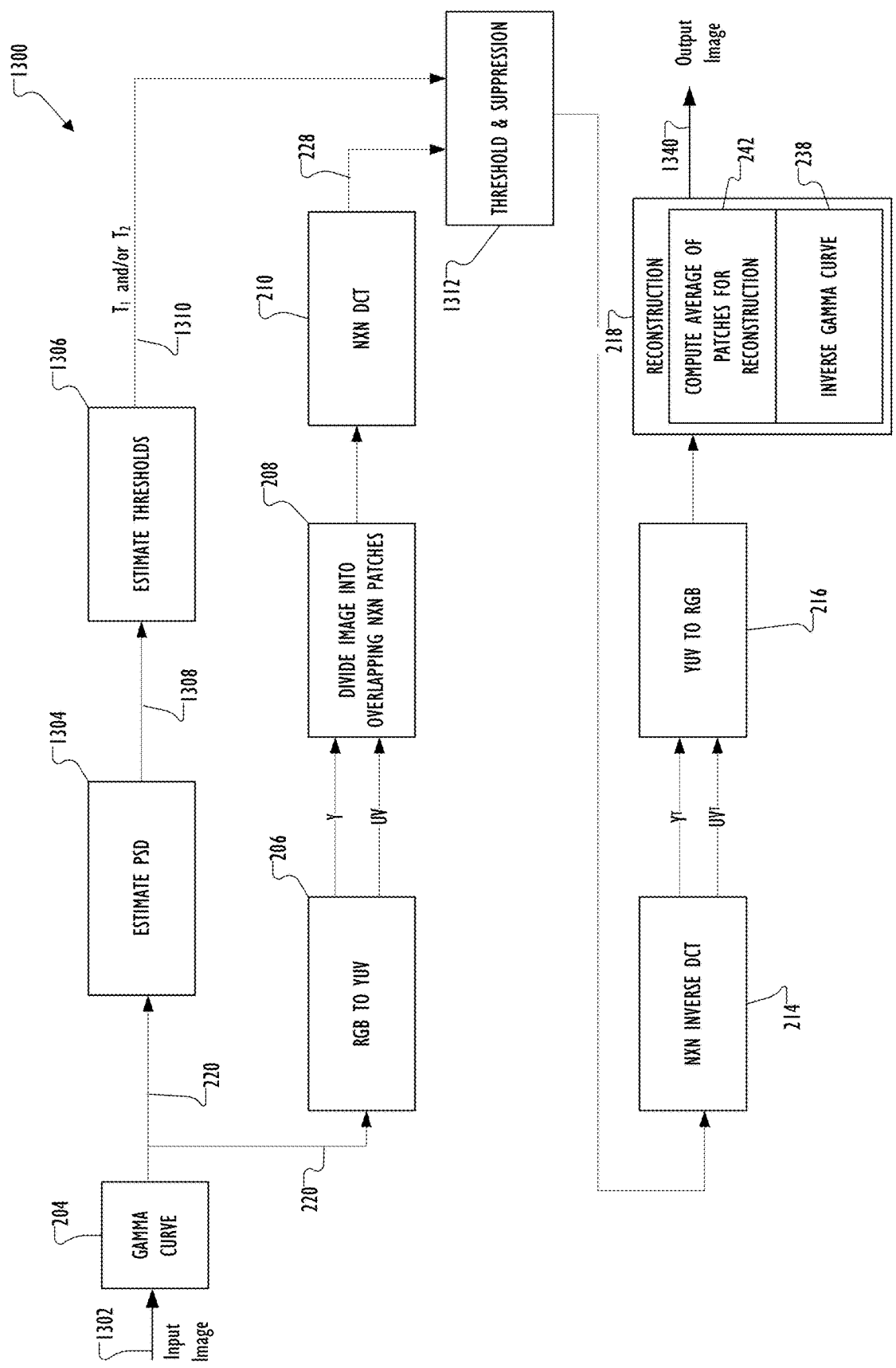
FIG. 13 illustrates a flow diagram of operations of a second example learning-based discrete cosine noise filter in accordance with various embodiments of this disclosure.

FIG. 13 illustrates a flow diagram of operations of a second example learning-based DCT-NF'" 1300 in accordance with various embodiments of this disclosure. The embodiment of the DCT-NF 1300 shown in FIG. 13 is for illustration only. Other embodiments of the DCT-NF 1300 could be used without departing from the scope of this disclosure. In certain embodiments, the DCT-NF 1300 is the same as, or implemented by, DCT-NF app 163. While multiple examples of a learning-based discrete cosine noise filter are shown, such as DCT-NF 200 and 1300 various components of the DCT-NF 200 can be the same as, or similar to, the components of the DCT-NF 1300. Similarly, it is further understood that the components of one DCT-NF from among the multiple DCT-NFs can be incorporated into the other DCT-NF and function in the same or similar way.

Figure 14:
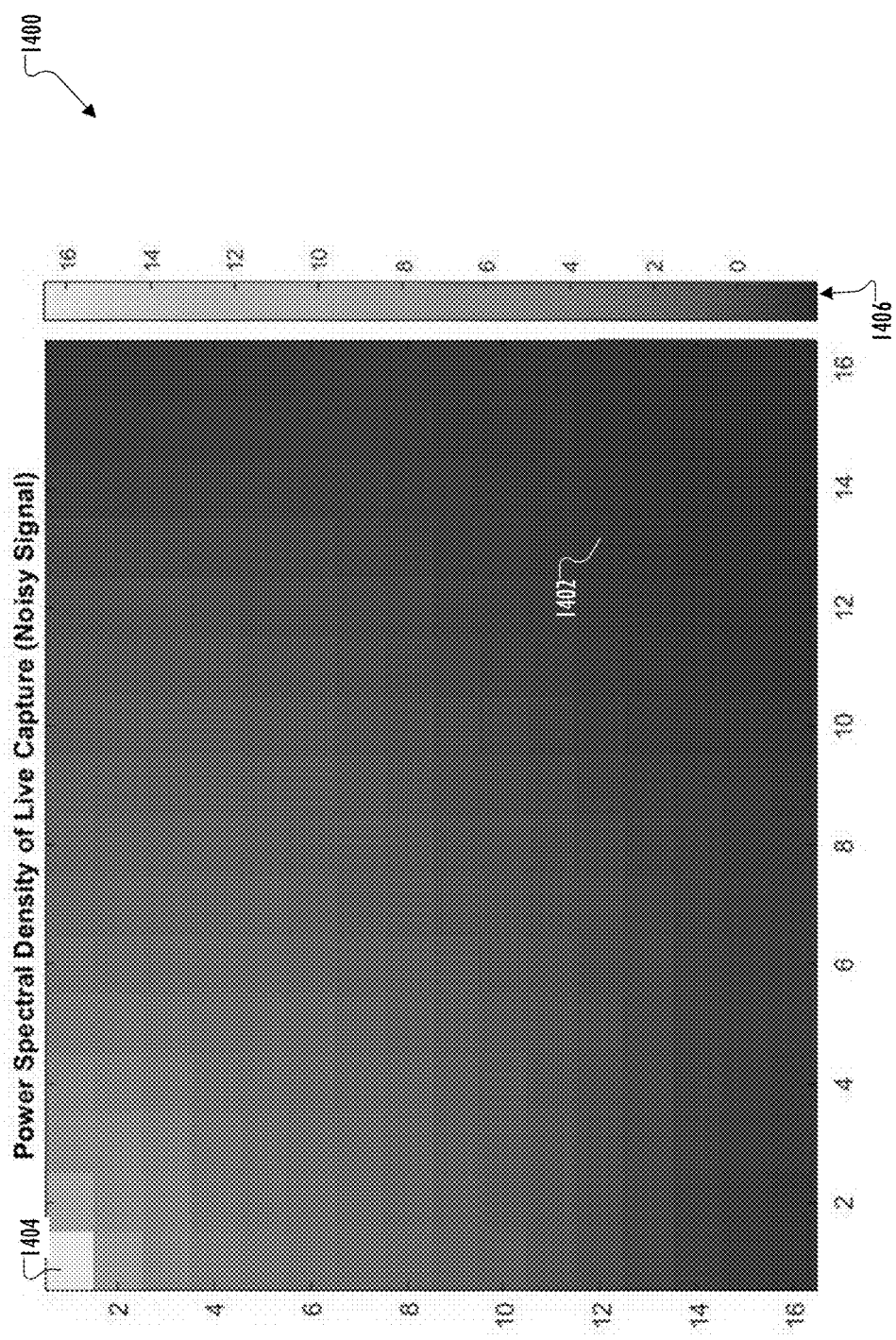
FIG. 14 illustrates power spectral density of a live capture in accordance with various embodiments of this disclosure.

The DCT-NF 1300 includes a PSD estimator 1304 and a threshold parameter estimator 1306, which enable the DCT-NF 1300 to learn the threshold parameters from a PSD map of live capture data, such as the PSD map 1400 of FIG. 14. For example, the input image 1302 may include live capture data, such as a stream of input images captured at a specified frames per second.

The PSD estimator 1304 receives the gamma-corrected image 220 and the PSD map 1400 from the gamma curve module 204. The PSD estimator 1304 is configured to determine a selected portion 1308 of the fourth quadrant of the PSD map 1400 that represents noise alone by analyzing the received PSD map 1400. In some embodiments, the selected portion 1308 is predetermined by a designer of the PSD estimator 1304, in which case the selected portion may include a particular set of cells within an N×N array, such as the particular set of cells within rows 12-16 of columns 13-16. In certain embodiments, the PSD estimator 1304 identifies a set of cells that contain a PSD value less than zero on the base-2 logarithmic scale (Log 2 scale), in which case the selected portion 1308 may include the identified set of cells.

The threshold parameter estimator 1306 sets values of the threshold parameters 1310 ($T_1$ and $T_2$) based on the live capture data within the PSD map 1400 and provides the values of the threshold parameters to the thresholding and suppression module 1312. The thresholding and suppression module 1312 then applies the thresholding and suppression algorithm to the DCT block 228 based on the received values of the threshold parameters 1310. In some embodiments, the values of the threshold parameters 1310 are set based on the selected portion 1308 received from the PSD estimator 1304. The threshold parameter estimator 1306 estimates the noise variance from the PSD map 1400 and uses the estimated noise variance to set the threshold (e.g., first threshold $T_1$ or second threshold $T_2$). For example, threshold parameter estimator 1306 can estimate that 0.3 is the value of noise variance of the PSD map 1400. Additionally, the threshold parameter estimator 1306 can determine that the noise standard deviation ($\sigma$) is approximately 0.5. The threshold parameter estimator 1306 selects or sets the thresholds $T_1$ and $T_2$ for the entire 16×16 DCT block to be the product (K×$\sigma$) of K multiplied by the noise standard deviation.

Although FIG. 13 illustrates a second example DCT-NF 1300, various changes may be made to FIG. 13. For example, various components in FIG. 13 could be combined, further subdivided, or omitted and additional components could be added according to particular needs. As a particular example, the DCT-NF 1300 can generate a DCT noise-filtered output image 1340 that exhibits an imperceptible noise due to removing noise based on live capture data (namely, input image 1302), which contains a larger set of data about the lighting conditions of the scene than the capture of a single input image 202.

FIG. 14 illustrates power spectral density map 1400 of a live capture in accordance with an embodiment of this disclosure. The power spectral density map 1400 can be generated by and output from the gamma curve module 204 based on the live capture of image data, which is also referred to as input image 1302.

A selected portion 1402 of the PSD map 1400 can represent the selected portion 1308 determined by the PSD estimator 1304. Also, the (1,1) block 1404 includes a bright yellow color that corresponds to the highest PSD value (such as 16) on the PSD scale 1406.

Figure 15:
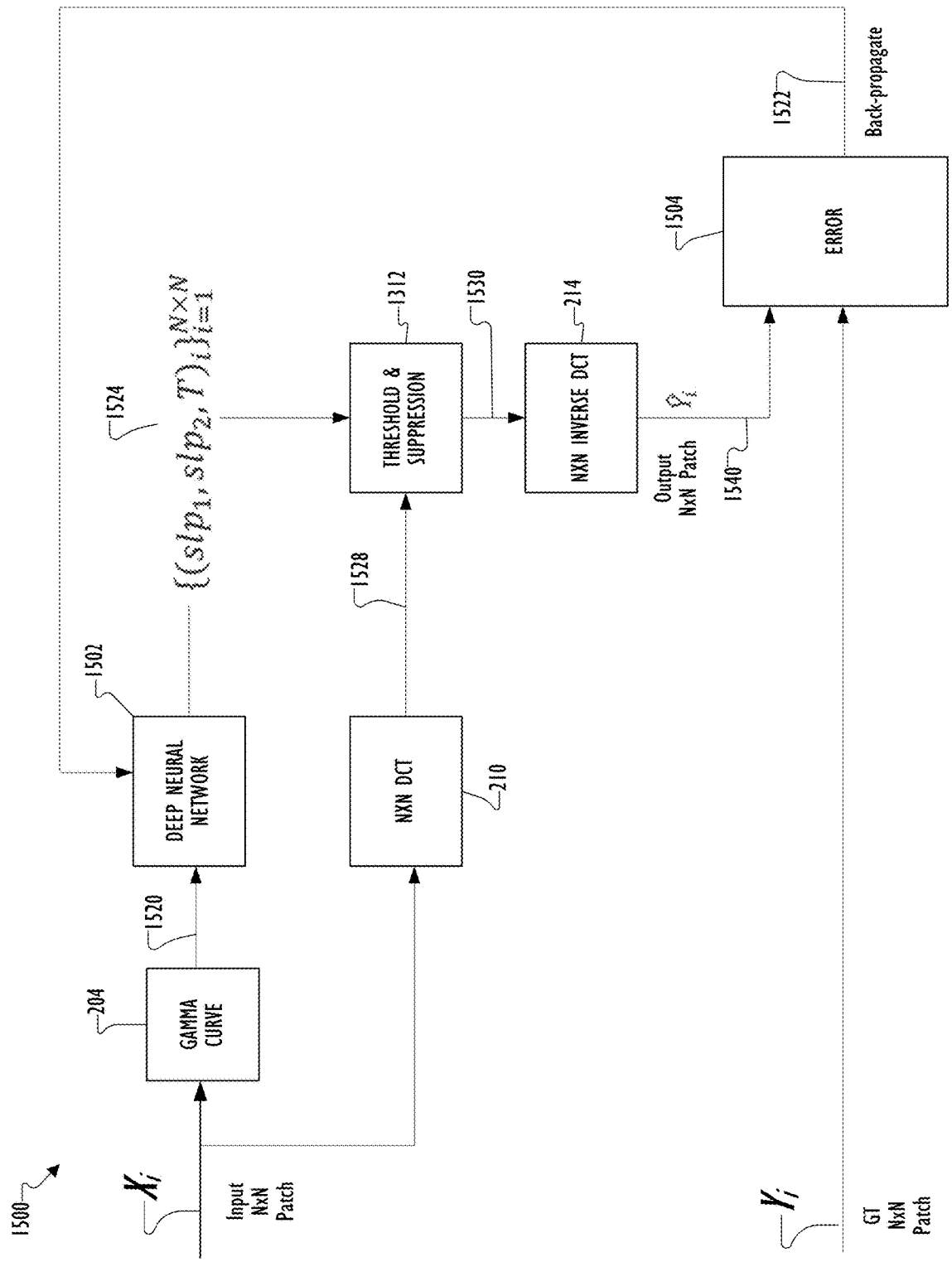
FIG. 15 illustrates a flow diagram of operations of a third example learning-based discrete cosine noise filter in accordance with various embodiments of this disclosure.

FIG. 15 illustrates a flow diagram of operations of a third example learning-based DCT-NF'' 1500 in accordance with various embodiment of this disclosure. The embodiment of the DCT-NF 1500 shown in FIG. 15 is for illustration only. Other embodiments of the DCT-NF 1500 could be used without departing from the scope of this disclosure. In certain embodiments, the DCT-NF 1500 is the same as, or implemented by, DCT-NF app 163. While multiple examples of a learning-based discrete cosine noise filter are shown, such as DCT-NF 200, 1300, and 1500, various components of the DCT-NF 200 can be the same as, or similar to, the components of the DCT-NF 1500. Similarly, it is further understood that the components of one DCT-NF from among the multiple DCT-NFs can be incorporated into the other DCT-NF and function in the same or similar way.

The DCT-NF 1500 includes an algorithm for learning the thresholding and suppression parameters from training data, which enables the DCT-NF 1500 to perform soft thresholding and suppression wherein and the parameters of the soft thresholding and suppression are learnt from the training data using a machine learning technique. That is, the threshold parameters, the suppression parameters, or a combination of the threshold and suppression parameters are learned from training data.

The DCT-NF 1500 includes the gamma curve module 204, DCT 210, thresholding and suppression module 212, and IDCT 214. The DCT-NF 1500 further includes a deep neural network 1502 and an error feedback module 1504, which enable the DCT-NF 1500 to undergo training to learn and set threshold and suppression parameters using a machine learning technique. During training, the DCT-NF 1500 receives an input block $X_i$, and a ground truth (GT) block Y for checking the results of machine learning for accuracy against the real world. The input block $X_i$ includes N×N patches representing a real-world input image, such as the input image 202 captured by from the camera 195. Similarly, the GT block $Y_i$ includes N×N patches representing an accurate result that the DCT-NF 1500 should output upon achieving a state of being "sufficiently trained," which is when a validation error is less than or equal to a specified tolerance value.

Within the DCT-NF 1500, the input block $X_i$ is inputted to and processed by the gamma curve module 204 and the DCT 210. The deep neural network 1502 receives a gamma-corrected block 1520 from the gamma curve module 204 and estimates threshold and suppression parameters for filtering the gamma-corrected block 1520 based on a validation error feedback 1522 received by the deep neural network 1502. For each iteration i of the training, the deep neural network 1502 provides a corresponding estimated threshold and suppression parameters 1524 to the thresholding and suppression module 212. In certain embodiments, the Equation 1 expresses that the estimated threshold and suppression parameters 1524 corresponding to the current iteration i includes a set that contains a first slope, second slope, and a threshold value ($slp_1$, $slp_2$, T).

$$\{(slp_1, slp_2, T)_i\}_{i=1}^{N \times N} \quad (1)$$

The thresholding and suppression module 1312 applies a thresholding and suppression algorithm to the DCT block 1528 received from the discrete cosine transformer 210, based on the estimated threshold and suppression parameters 1524 received from the deep neural network 1502. The IDCT 214 generates and outputs a DCT noise-filtered output block 1540 ($\hat{Y}_i$) by applying an IDCT to the suppressed DCT block 1530. The DCT noise-filtered output block 1540 includes an N×N patches. In some embodiments, the DCT noise-filtered output block 1540 represents a luminance channel ($Y^T$).

The error feedback module 1504 compares the resulting DCT noise-filtered output block 1540 ($\hat{Y}_i$) to the corresponding (GT) block $Y_i$, calculates validation error feedback 1522 based on a difference between $\hat{Y}_i$ and $Y_i$, and sends the validation error feedback 1522 to the deep neural network 1502. The validation error feedback 1522 is configured to adjust the deep neural network 1502 to reduce future error, namely, the difference between resulting DCT noise-filtered output block ($\hat{Y}_{i+1}$) to the corresponding (GT) block $Y_{i+1}$ of the next iteration.

Although FIG. 15 illustrates a third example DCT-NF 1500, various changes may be made to FIG. 15. For example, various components in FIG. 15 could be combined, further subdivided, or omitted and additional components could be added according to particular needs.

Figure 16:
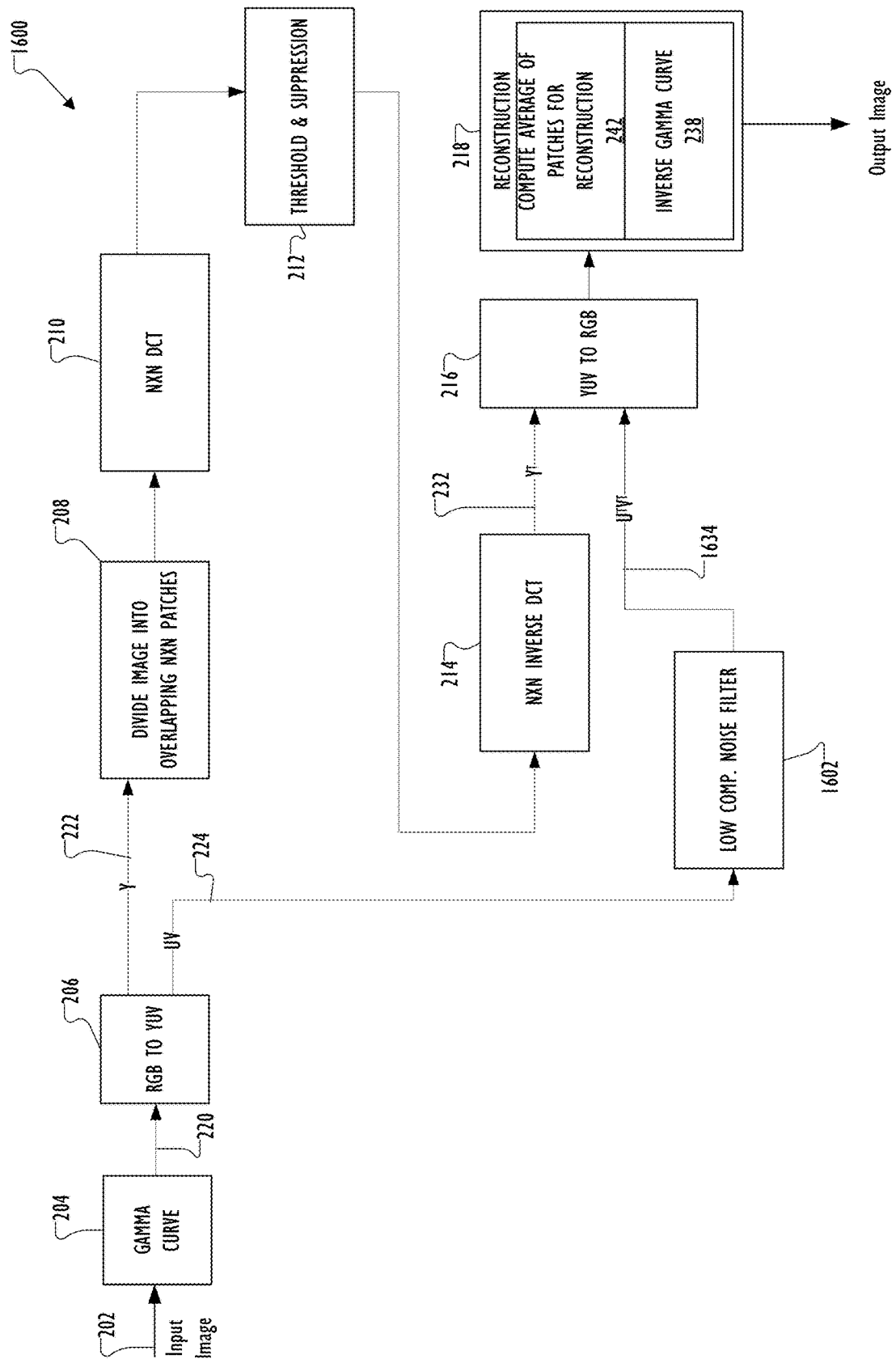
FIG. 16 illustrates a flow diagram of operations of a fourth example learning-based discrete cosine noise filter in accordance with various embodiments of this disclosure.

FIG. 16 illustrates a flow diagram of operations of a fourth example DCT-NF 1600 in accordance with various embodiments of this disclosure. The embodiment of the DCT-NF 1600 shown in FIG. 16 is for illustration only. Other embodiments of the DCT-NF 1600 could be used without departing from the scope of this disclosure. In certain embodiments, the DCT-NF 1600 is the same as, or implemented by, DCT-NF app 163. While multiple examples of a discrete cosine noise filter are shown, such as DCT-NF 200, 1300, 1500, and 1600, various components of the DCT-NF 200 can be the same as, or similar to, the components of the DCT-NF 1600. Similarly, it is further understood that the components of one DCT-NF from among the multiple DCT-NFs can be incorporated into the other DCT-NF and function in the same or similar way.

The U channel and V channel images 724*u* and 724*v* of FIGS. 7C and 7D show few details of from the input image 702, compared to many details present in the Y channel image 724*y* of FIG. 7B. The U and V channel images 724*u* and 724*v*, as inputs to a noise filter, begin with few details to be preserved, and the noise filtering process may further reduce the number of details in the images. The U and V channel images 724*u* and 724*v* contain comparatively less information about the structure of the input image 702 as compared to the luminance channel image 722*y*. Therefore, chrominance channels 224, including the U and V channels, can be filtered by a computationally less expensive filter (such as a Gaussian noise filter), which may not be designed to preserve more details from the input image compared to the DCT filter according to embodiments of the present disclosure that is designed to preserve more details from the input image. For the case of these chrominance channels 224, since the U and V channels contain comparatively less information about the structure of the input image, the chrominance channels 224 can be filtered by the computationally less expensive filter. Therefore, the U and V channel images 724u and 724v can be filtered using low computational filters.

The DCT-NF 1600 provides a technical advantage of reducing consumption of processor computing resources by separately filtering a U channel and a V channel of the converted input image through a separate noise filter that has a lower computational complexity than the noise filter that filters the Y channel of the converted input image. The DCT-NF 1600 not only includes the components of the DCT-NF 200 of FIG. 2, but also includes a low complexity noise filter (LC-NF) 1602 that receives the chrominance channel 224 (UV) output from the first conversion module 206, and filters out noise from the chrominance channel 224, and outputs a noise-reduced chrominance channel 1634 ($U^T V^T$). In various examples, the LC-NF 1602 may be a N/2×N/2 filter (where N is the patch size) similar to the DCT-NF 200, a low computational low pass filter, or a Gaussian filter.

The DCT-NF 1600 filters the luminance channel 222 output from the first conversion module 206 in a similar manner as the DCT-NF 200 of FIG. 2. In this case, the second conversion module 216 combines or re-combines the luminance channels 232 ($Y^T$) with noise-reduced chrominance channels 1634 ($U^T V^T$).

Although FIG. 16 illustrates a fourth example DCT-NF 200, various changes may be made to FIG. 16. For example, various components in FIG. 16 could be combined, further subdivided, or omitted and additional components could be added according to particular needs.

Figure 17:
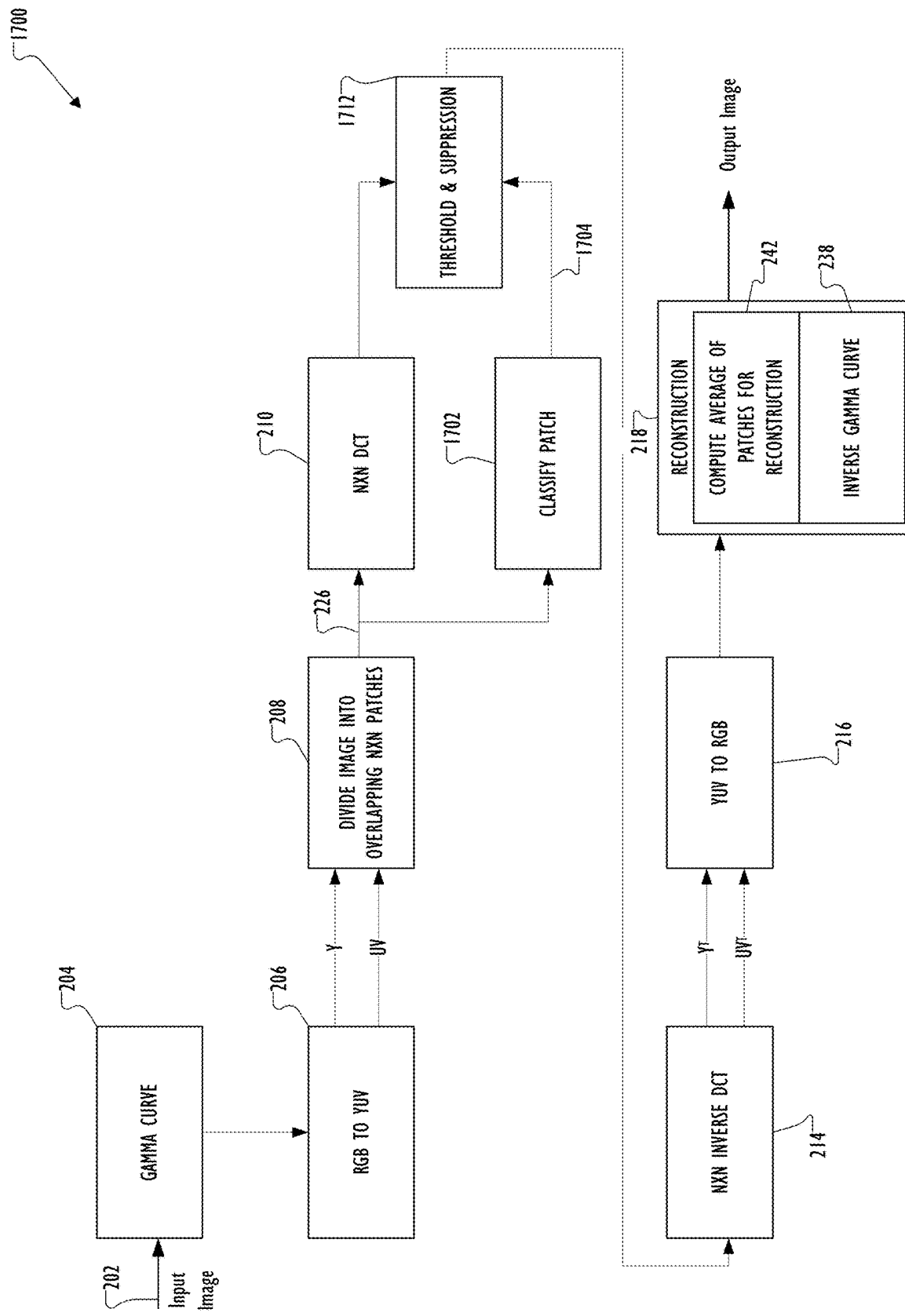
FIG. 17 illustrates a flow diagram of operations of a fifth example learning-based discrete cosine noise filter in accordance with various embodiments of this disclosure.
Figure 18B:
FIGS. 18A-18B, 19A-19B, 20A-20B, and 21A-21B illustrate examples of a baseline image and a DCT noise-filtered image, respectively, in accordance with various embodiments of this disclosure.
Figure 18A:
Figure 19B:
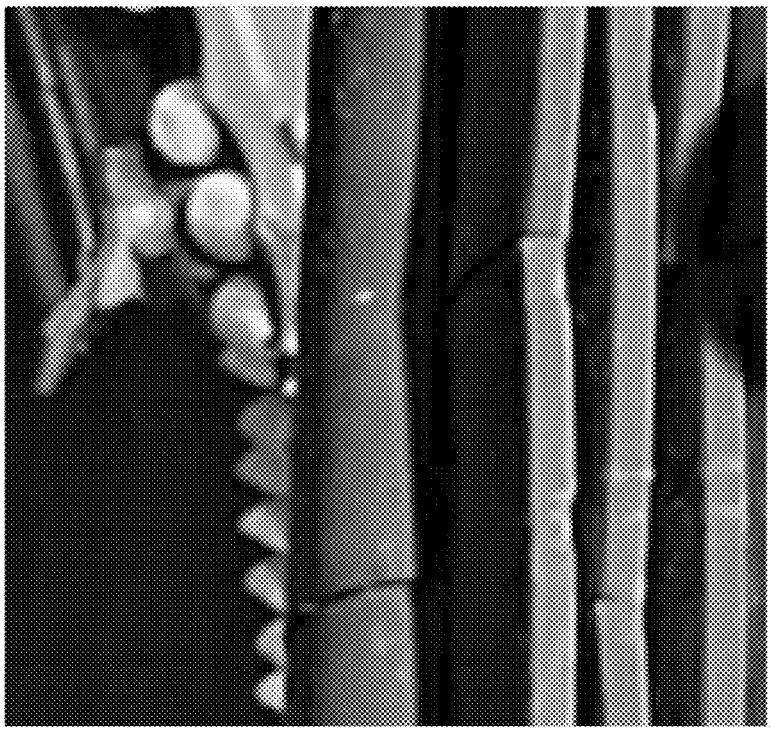
Figure 19A:
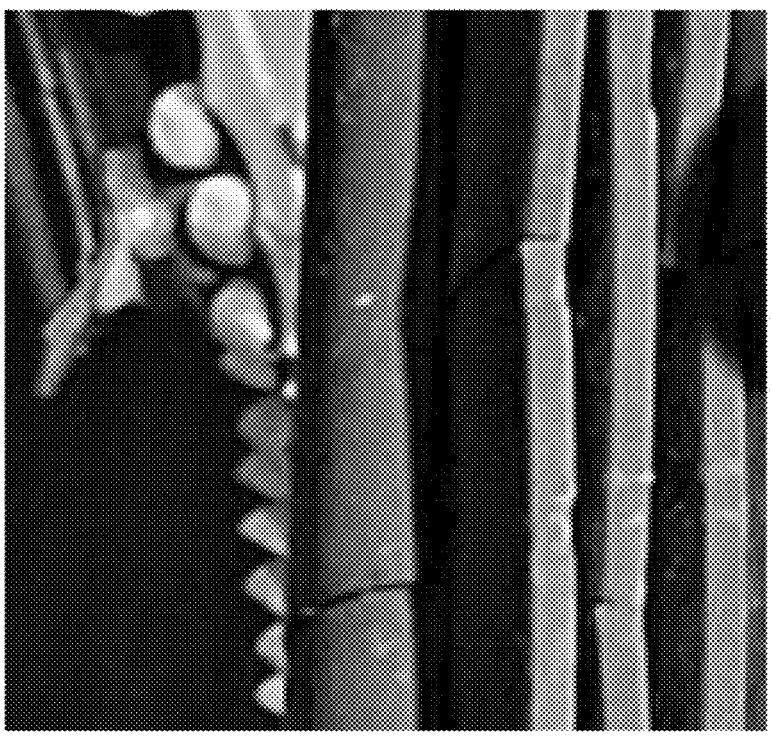
Figures 20A, 20B:
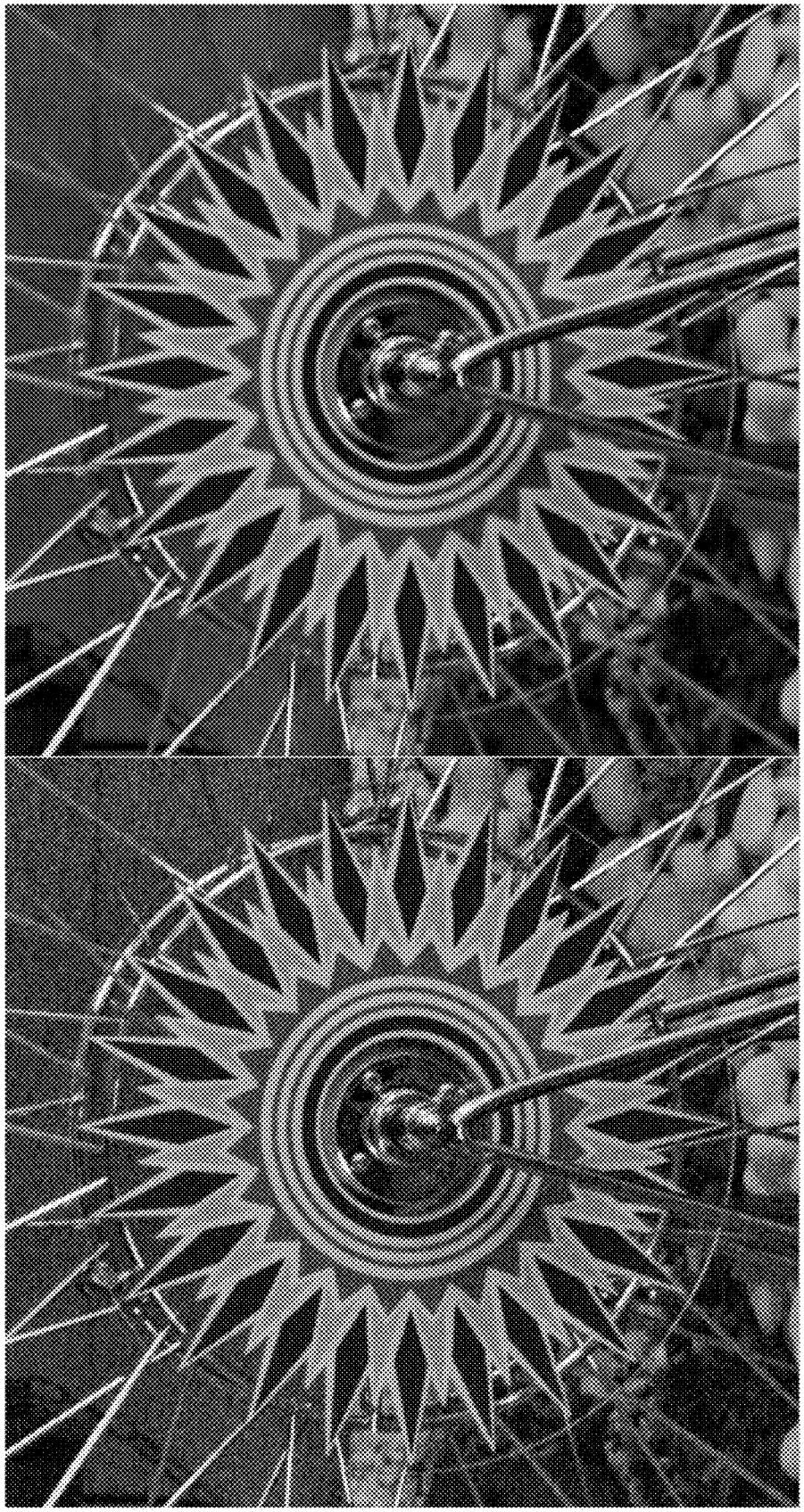
Figures 21A, 21B:
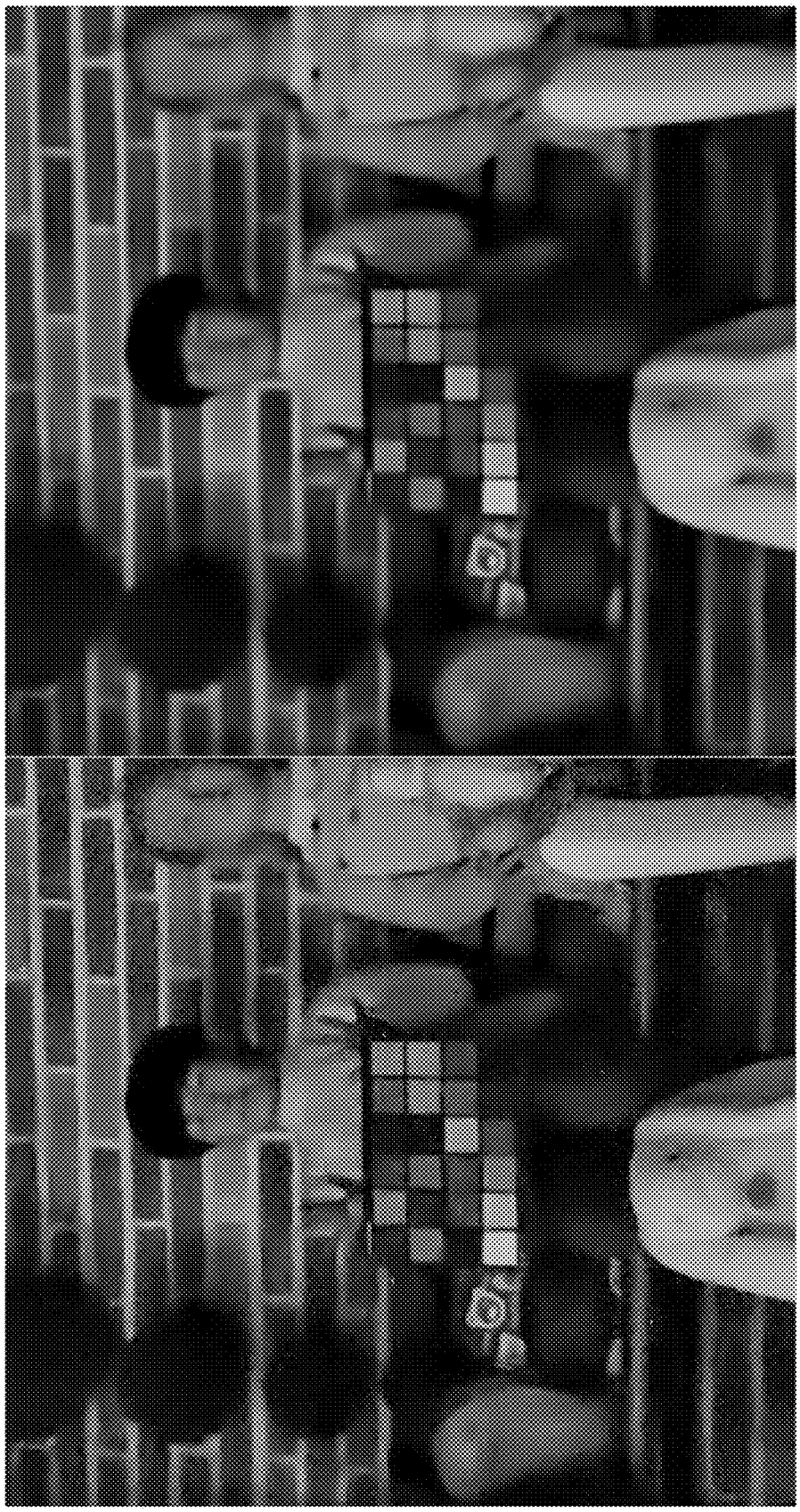

FIG. 17 illustrates a flow diagram of operations of a fifth example DCT-NF 1700 in accordance with various embodiments of this disclosure. The embodiment of the DCT-NF 1700 shown in FIG. 17 is for illustration only. Other embodiments of the DCT-NF 1700 could be used without departing from the scope of this disclosure. In certain embodiments, the DCT-NF 1700 is the same as, or implemented by, DCT-NF app 163. While multiple examples of a discrete cosine noise filter are shown, such as DCT-NF 200, 1300, 1500, 1600, and 1700 it is understood that the components of the DCT-NF 200 can be the same as, or similar to, the components of the DCT-NF 1700. Similarly, it is further understood that the components of one DCT-NF from among the multiple DCT-NFs can be incorporated into the other DCT-NF and function in the same or similar way.

The DCT-NF 1700 includes a patch classifier 1702 for classifying patches of the block of overlapping patches within the deconstructed image 226. In some embodiments, the patch classifier 1702 assigns a patch classification to each of the patches within the deconstructed image 226, and outputs assigned-classification information 1704. The assigned-classification information 1704 relates each of the patches within the deconstructed image 226 to a corresponding patch classification assigned the patch.

The thresholding and suppression module 1712 included within the DCT-NF 1700 suppresses the patches of the block of overlapping patches based on threshold parameters and suppression parameters that vary spatially based upon the classification. That is, the thresholding and suppression module 1712 can select, from a plurality of selectable threshold parameters and suppression parameters, threshold parameters and suppression parameters that vary spatially. In some embodiments, thresholding and suppression module 1712 stores selectable threshold parameters and suppression parameters in relation to a particular patch classification. The threshold parameters and suppression parameters selected by thresholding and suppression module 1712 may be selected based on matching the received assigned-classification information 1704 to the particular patch classification related to the selected threshold parameters and suppression parameters.

Although FIG. 17 illustrates a fifth example DCT-NF 1700, various changes may be made to FIG. 17. For example, various components in FIG. 17 could be combined, further subdivided, or omitted and additional components could be added according to particular needs.

FIGS. 18A-18B, 19A-19B, 20A-20B, and 21A-21B illustrate examples of an input image 202a-202d and a DCT noise-filtered image 240a-240d, respectively, in accordance with an embodiment of this disclosure. The DCT NF algorithms performed by the various DCT-NFs 200, 1300, 1500, 1600, and 1700 provide a good trade-off between noise-reduction and detail preservation.

Figure 22:
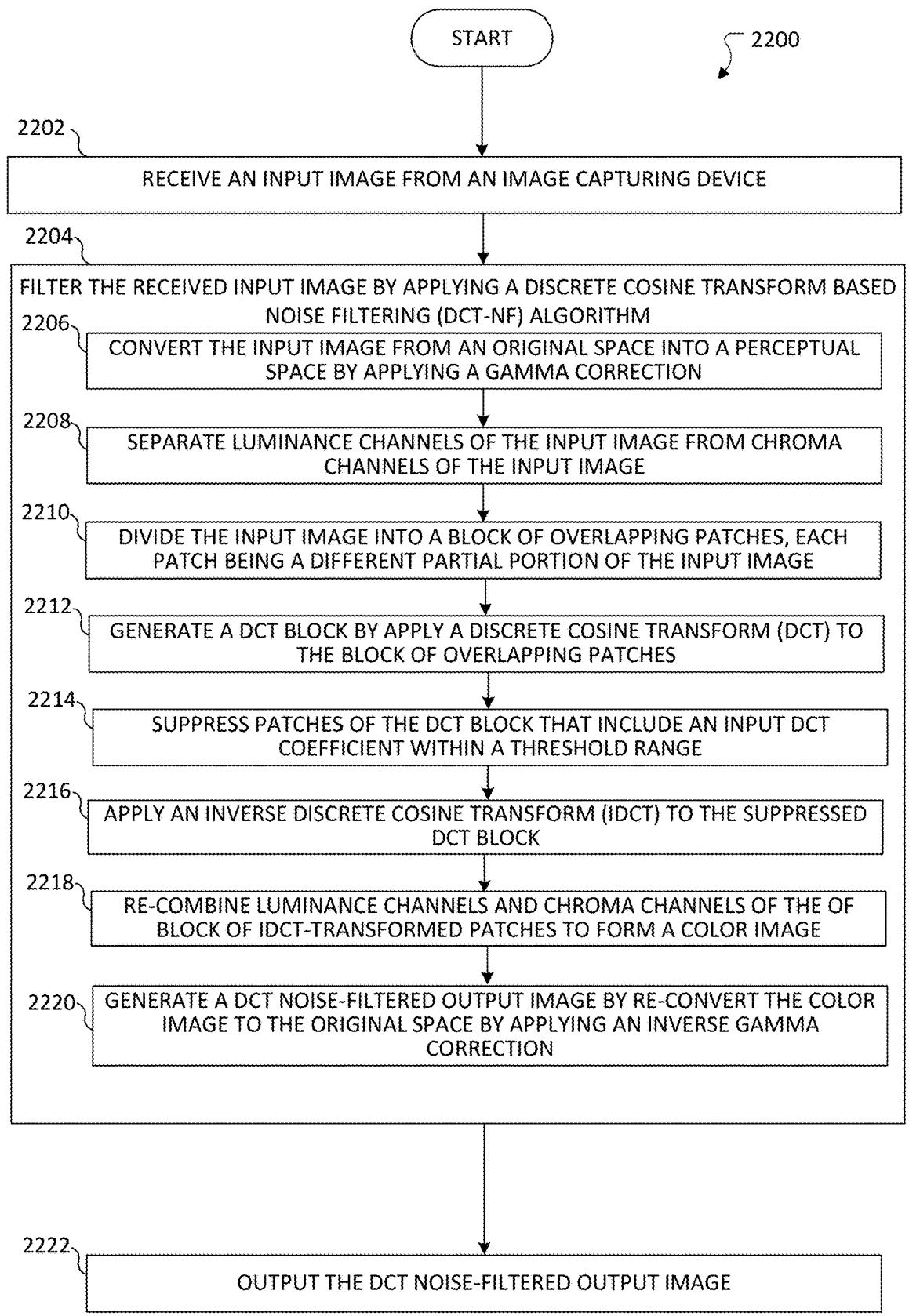
FIG. 22 illustrates a process for learning-based discrete cosine noise filtering in accordance with various embodiments of this disclosure.

FIG. 22 illustrates a process for discrete cosine noise filtering in accordance with various embodiments of this disclosure. The method 2200 is implemented by an electronic device 101 that includes at least one of the DCT-NFs 200, 1300, 1500, 1600, and 1700. That is, in certain embodiment, the method 220 is a process for learning-based discrete cosine noise filtering in accordance with various embodiments of this disclosure. More particularly, the method 2200 could be performed by a processor 120 of the electronic device 101 executing the DCT-NF 163. For ease of explanation, the method 2300 is described as being performed by the processor 120.

In operation 2202, the processor 120 receives an input image 202 from an image capturing device. In operation 2204, a DCT-NF algorithm is applied to the received input image.

The processor 120 can execute the DCT-NF algorithm by performing operations 2206-220. In operation 2206, the input image is converted from an original space into a perceptual space by applying a gamma correction. In operation 2208, the processor 120 separates luminance channels of the input image from chroma channels of the input image. In some embodiments, the processor 120 separates luminance channels by converting the input image from an RGB domain to a YUV domain. In operation 2210, the input image is divided into a block of overlapping patches. Each patch 810, 812, 814 is a different partial portion of the input image. The deconstructed image 226 is an example of the block of overlapping patches. The block of overlapping patches includes a first grid of M×M patches that at least partially overlaps a second grid of M×M patches. For example, the first grid may include first patches 810, and the second grid may include second patches 812. In certain embodiments, dividing the input image into the overlapping patches includes selecting a patch size, and determining a grid size based on the selected patch size and the size of the input image. In operation 2212, the processor 120 generates a DCT block 228 by applying a discrete cosine transform to the block of overlapping patches. In operation 2214, patches of the DCT block 228 that include an input DCT coefficient that has a value within a threshold range 1152 are suppressed. The suppression is based on the suppression threshold curve 1150. In some embodiments, the threshold range 1152 is defined by a first slope for input DCT coefficient values within a first suppression range 1154, and a second slope for input DCT coefficient values within a second suppression range 1156. In certain embodiments, remaining overlapping patches that include an input DCT coefficient outside of the threshold range 1152 are not suppressed.

In operation 2216, the processor 120 applies an inverse discrete cosine transform to the suppressed DCT block 230, which includes the suppressed patches and the remaining overlapping patches that include an input DCT coefficient outside of the threshold range. In operation 2218, the luminance channels 232 ($Y^T$) and chrominance channels 234 ($U^T V^T$) of the of block of IDCT-transformed patches are re-combined to form a color image 236. In some embodiments, the processor 120 re-combines the luminance channels with the chroma channels by converting the block of IDCT-transformed patches from the YUV domain to the RGB domain. In a particular example, the block of IDCT-transformed patches can be a collection or combination of the luminance and chrominance channels 232 and 234. In operation 2220, the processor 120 generates a DCT noise-filtered output image 240 by re-converting the color image 236 to the original space by applying an inverse gamma correction.

In certain embodiments, the processor 120 can execute the DCT-NF algorithm by performing additional operations, such as tuning threshold parameters and suppression parameters that define the threshold range 1152, where the tuning is based on a power spectral density obtained from a live image capture. The threshold parameters, suppression parameters, or a combination of threshold and suppression parameters may be learned from training data using a machine learning technique. The training data may include an input block $X_i$ and a corresponding ground truth block $Y_i$. In some embodiments, executing the DCT-NF algorithm includes classifying patches of the block of overlapping patches; and suppressing the patches of the block of overlapping patches based on threshold parameters and suppression parameters that vary spatially based upon the classification.

In some embodiments, executing the DCT-NF algorithm includes computing an average of patches for reconstruction within the color image 236. For example, generating the DCT noise-filtered output image 240 can include computing the average of the patches within the color image 236.

In operation 2222, the DCT noise-filtered output image 240 is output. In certain embodiments, the DCT noise-filtered output image 240 is output to a display 160 for displaying to a user.

The above flowchart illustrates and example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
   receiving an input image from an image capturing device;
   filtering the received input image by applying a discrete cosine transform based noise filtering (DCT-NF) process, the DCT-NF process comprising:
   converting the input image from an original space into a perceptual space by applying a gamma correction to generate a gamma-corrected image;
   separating a luminance channel from chroma channels of the input image or the gamma-corrected image to generate a luminance image composed of the luminance channel and chrominance images composed of the chroma channels, respectively;
   dividing the luminance image into overlapping patches, each patch being a different partial portion of the luminance image, wherein the overlapping patches include a first grid of patches that at least partially overlaps a second grid of patches;
   computing a discrete cosine transform (DCT) of the overlapping patches;
   among the overlapping patches, suppressing patches that include an input DCT coefficient within a threshold range;
   applying an inverse discrete cosine transform (IDCT) to the suppressed patches and to remaining overlapping patches that include an input DCT coefficient outside of the threshold range to generate IDCT-transformed patches;
   combining a luminance channel of the IDCT-transformed patches and the chrominance images to form a color image; and
   generating a DCT noise-filtered output image by applying an inverse gamma correction to convert the color image to the original space; and
   outputting the DCT noise-filtered output image;
   wherein the second grid of patches covers a different portion of the luminance image than the first grid of patches such that (i) the first grid of patches covers part of the luminance image not covered by the second grid of patches and (ii) the second grid of patches includes an empty portion not covering any portion of the luminance image.

2. The method of claim 1, wherein the DCT-NF process further comprises:
   tuning threshold parameters and suppression parameters defining the threshold range based on a power spectral density obtained from a live image capture.

3. The method of claim 1, wherein at least one of threshold parameters or suppression parameters are learned from training data using a machine learning technique.

4. The method of claim 1, wherein:
separating the luminance channel from the chroma channels comprises converting, from an RGB domain to a YUV domain, the input image or the gamma-corrected image; and
combining the luminance channel of the IDCT-transformed patches and the chroma images comprises converting from the YUV domain to the RGB domain.

5. The method of claim 4, wherein the DCT-NF process further comprises:
separately filtering a U channel and a V channel of the input image or the gamma-corrected image through a low computational filter.

6. The method of claim 4, wherein the DCT-NF process further comprises:
classifying patches among the overlapping patches; and
suppressing the classified patches based on threshold parameters and suppression parameters that vary spatially based upon the classification.

7. The method of claim 1, wherein:
the first grid of patches includes a first grid of M×M patches; and
the second grid of patches includes a second grid of M×M patches.

8. The method of claim 1, wherein the threshold range is defined by a first slope for input DCT coefficient values within a first suppression range, and a second slope for input DCT coefficient values within a second suppression range.

9. The method of claim 1, further comprising computing an average of patches for reconstruction within the color image.

10. An electronic device comprising:
a display; and
at least one processor configured to:
receive an input image from an image capturing device;
filter the received input image by applying a discrete cosine transform based noise filtering (DCT-NF) process, wherein the at least one processor is configured to perform the DCT-NF process by:
converting the input image from an original space into a perceptual space by applying a gamma correction to generate a gamma-corrected image;
separating a luminance channel from chroma channels of the input image or the gamma-corrected image to generate a luminance image composed of the luminance channel and chrominance images composed of the chroma channels, respectively;
dividing the luminance image into overlapping patches, each patch being a different partial portion of the luminance image, wherein the overlapping patches include a first grid of patches that at least partially overlaps a second grid of patches;
computing a discrete cosine transform (DCT) of the overlapping patches;
among the overlapping patches, suppressing patches that include an input DCT coefficient within a threshold range;
applying an inverse discrete cosine transform (IDCT) to the suppressed patches and to remaining overlapping patches that include an input DCT coefficient outside of the threshold range to generate IDCT-transformed patches;
combining a luminance channel of the IDCT-transformed patches and the chrominance images to form a color image; and
generating a DCT noise-filtered output image by applying an inverse gamma correction to convert the color image to the original space; and
output the DCT noise-filtered output image for displaying on the display;
wherein the second grid of patches covers a different portion of the luminance image than the first grid of patches such that (i) the first grid of patches covers part of the luminance image not covered by the second grid of patches and (ii) the second grid of patches includes an empty portion not covering any portion of the luminance image.

11. The electronic device of claim 10, wherein the DCT-NF process further comprises:
tuning threshold parameters and suppression parameters defining the threshold range based on a power spectral density obtained from a live image capture.

12. The electronic device of claim 10, wherein at least one of threshold parameters or suppression parameters are learned from training data using a machine learning technique.

13. The electronic device of claim 10, wherein the at least one processor is configured to:
separate the luminance channel from the chroma channels by converting, from an RGB domain to a YUV domain, the input image or the gamma-corrected image; and
combine the luminance channel of the IDCT-transformed patches and the chroma images by converting from the YUV domain to the RGB domain.

14. The electronic device of claim 13, wherein the DCT-NF process further comprises:
separately filtering a U channel and a V channel of the input image or the gamma-corrected image through a low computational filter.

15. The electronic device of claim 13, wherein the DCT-NF process further comprises:
classifying patches among the overlapping patches; and
suppressing the classified patches based on threshold parameters and suppression parameters that vary spatially based upon the classification.

16. The electronic device of claim 10, wherein:
the first grid of patches includes a first grid of M×M patches; and
the second grid of patches includes a second grid of M×M patches.

17. The electronic device of claim 10, wherein the threshold range is defined by a first slope for input DCT coefficient values within a first suppression range, and a second slope for input DCT coefficient values within a second suppression range.

18. The electronic device of claim 10, wherein the at least one processor is configured to compute an average of patches for reconstruction within the color image.

19. A non-transitory computer readable medium embodying a computer program, the computer program comprising computer readable program code that when executed causes at least one processing device to:
receive an input image from an image capturing device;
filter the received input image by applying a discrete cosine transform based noise filtering (DCT-NF) process, the DCT-NF process comprising:
converting the input image from an original space into a perceptual space by applying a gamma correction to generate a gamma-corrected image;
separating a luminance channel from chroma channels of the input image or the gamma-corrected image to generate a luminance image composed of the luminance channel and chrominance images composed of the chroma channels, respectively;

dividing the luminance image into overlapping patches, each patch being a different partial portion of the luminance image, wherein the overlapping patches include a first grid of patches that at least partially overlaps a second grid of patches;

computing a discrete cosine transform (DCT) of the overlapping patches;

among the overlapping patches, suppressing patches that include an input DCT coefficient within a threshold range;

applying an inverse discrete cosine transform (IDCT) to the suppressed patches and to remaining overlapping patches that include an input DCT coefficient outside of the threshold range to generate IDCT-transformed patches;

combining a luminance channel of the IDCT-transformed patches and the chrominance images to form a color image; and generating a DCT noise-filtered output image by applying an inverse gamma correction to convert the color image to the original space; and output the DCT noise-filtered output image;

wherein the second grid of patches covers a different portion of the luminance image than the first grid of patches such that (i) the first grid of patches covers part of the luminance image not covered by the second grid of patches and (ii) the second grid of patches includes an empty portion not covering any portion of the luminance image.

20. The non-transitory computer readable medium of claim 19, wherein the DCT-NF process further comprises:

tuning threshold parameters and suppression parameters defining the threshold range based on a power spectral density obtained from a live image capture.

* * * * *